United States Patent
Madrahalli et al.

(10) Patent No.: US 7,852,863 B2
(45) Date of Patent: Dec. 14, 2010

(54) SYSTEM AND METHODS FOR CONNECTIONS USING AUTOMATICALLY SWITCHED OPTICAL NETWORK CONTROL PLANES

(75) Inventors: Vagish Madrahalli, Woodstock, GA (US); Kelai Shi, Johns Creek, GA (US); Xuan Zheng, Alpharetta, GA (US); Zhiwei Rong, Johns Creek, GA (US); Bhavesh Nisar, Alpharetta, GA (US)

(73) Assignee: Ciena Corporation, Linthicum, MD (US)

( * ) Notice: Subject to any disclaimer, the term of this patent is extended or adjusted under 35 U.S.C. 154(b) by 347 days.

(21) Appl. No.: 11/961,124

(22) Filed: Dec. 20, 2007

(65) Prior Publication Data

US 2009/0161681 A1    Jun. 25, 2009

(51) Int. Cl.
*H04L 12/28* (2006.01)

(52) U.S. Cl. .................................. 370/401; 370/399
(58) Field of Classification Search .............. None
See application file for complete search history.

(56) References Cited

U.S. PATENT DOCUMENTS 7,321,932 B1 *   1/2008   Monga et al. ............... 709/227
7,382,785 B2 *   6/2008   Chen et al. .................. 370/399

* cited by examiner

*Primary Examiner*—Robert W Wilson
(74) *Attorney, Agent, or Firm*—Clements Bernard PLLC; Christopher L. Bernard; Tyler S. Brown

(57) ABSTRACT

Systems and methods for connections on an Automatically Switched Optical Network (ASON) network including an ASON database and path computation algorithm, mechanisms for Ethernet connections over ASON, and mechanisms for label negotiation for SNCs are provided. Advantageously, the present invention provides mechanisms for ASON path computation and virtual topology management, Ethernet connection establishment, modification, and deletion in ASON networks, and label negotiation without requiring binding and releasing of connections before label negotiation.

19 Claims, 13 Drawing Sheets

Level 0 – Domain's Physical Topology

Level 1 – Abstract Topology

Level 2 – Abstract Topology Advertisements in INNI Cloud

SYSTEM AND METHODS FOR CONNECTIONS USING AUTOMATICALLY SWITCHED OPTICAL NETWORK CONTROL PLANES

FIELD OF THE INVENTION

The present invention relates generally to Automatically Switched Optical Network (ASON) optical control planes, and more particularly, to systems and methods for connections on an ASON network including an ASON database and path computation algorithm, mechanisms for Ethernet connections over ASON, and mechanisms for label negotiation for Sub Network Connections (SNCs).

BACKGROUND OF THE INVENTION

Optical control plane implementations provide automated setup and control of services. Advantageously, control planes offer multi-vendor and inter-domain inter-working, enhanced service offerings such as Ethernet over SONET/SDH or Optical Transport Network (OTN), end-to-end service activation, cross-domain provisioning of switched connection services, and the like. Traditionally, creating traffic paths through a series of Network Elements (NEs) has involved configuration of individual cross-connects on each NE. Control planes allow a user to specify the start point, end point, and bandwidth required, and an agent on the Network Elements allocates a path through the network, provisioning the traffic path, setting up cross-connects, and allocating bandwidth from the paths for the user requested service. The actual path that the traffic will take through the network is not specified by the user.

Several control plane standards exist including ITU-T Automatically Switched Optical Network (ASON), IETF Generalized Multi-Protocol Label Switching (G-MPLS) also known as Automatic Switched Transport Network (ASTN), and Optical Internetworking Forum (OIF) User-Network Interface Signaling Specifications (UNI) and Inter-Carrier Network Interface Signaling Specification. ASON specifications generally define an optical control plane communication framework. G-MPLS defines control plane discovery, routing, and signaling protocols. OIF UNI/E-NNI specifications define protocol extensions for multi-vendor interoperability.

OIF defines an Optical User to Network Interface (O-UNI) for an interface between a client network and an optical network. This further includes signaling and SPC connection creation, deletion, query, and the like, and does not provide topology information exchanged between client and network. OIF also defines an External Network Node Interface (E-NNI) between optical networks and between areas within a single network. This provides signaling for connection establishment, removal, restoration, and the like. Advantageously, E-NNI and O-UNI provide interoperability of intelligent optical networks with control plane messaging. For example, an ASON network can be compartmentalized into multiple independent control domains. The E-NNI interfaces provide interoperability between the multiple independent control domains.

Referring to FIG. 1, in an ASON network 10, connections can be requested originally from either a client device 12$a$, 12$b$ (in which case it is called a switched connection (SC) 14) or a management system interface 16 (in which case it is called a soft permanent connection (SPC) 18). In this exemplary embodiment, the ASON network 10 includes three control domains: domain A 20, domain B 22, and domain C 24, and six network elements (NEs) 30,32,34,36,38,40. The requesting entity can be part of any control domain 20,22,24 or part of an exterior network.

Domain A 20 includes NEs 30,32 as border nodes (BNs). Domain B 22 includes NEs 34, 36 as BNs, and domain C 24 includes NEs 38,40 as BNs. Each of the domains 20,22,24 can include other NEs in-between the BNs (not shown), and these are referred to as interior nodes (INs). In this exemplary embodiment, clients 12$a$,12$b$ connect to NEs 30,40, respectively, using an O-UNI connection. This allows for control plane interoperability between the clients 12$a$,12$b$ and the domains 20,22,24. The domains 20,22,24 interconnect with E-NNI interfaces between NEs 32 and 34 for interconnection of domain A 20 and domain B 22 and between NEs 36 and 38 for interconnection of domain B 22 and domain C 24.

Sub Network connections (SNC) 42,44,46 originate across one border node of a network (i.e., domain 20,22,24) and terminate on another border node across the same network (i.e., domain 20,22,24). In FIG. 1, SNC 42 originates from NE 30 and terminates on NE 32, SNC 44 originates on NE 34 and terminates on NE 36, and SNC 46 originates from NE 38 and terminates on NE 40. The links between NEs 32 and 34, 36 and 38 are E-NNI links. The end NEs 30,40 across the domains 20,22,24 could be SC clients that originate and terminate the SC connection 14. So, typically an SC or SPC connection can include multiple SNC connections. Also, the connections 14,18 could include SONET/SDH services or Ethernet resources. In the case of an Ethernet connection request, the connection has to be created in a multi layer fashion with PATH Messages for Ethernet, Virtual Concatenation (VCAT), and SONET/SDH layer. For the Ethernet connection, only ingress and egress network end nodes are aware of Ethernet and VCAT layers, and all other nodes are just SONET layer aware.

To set up connections, the ASON network 10 performs a path computation to build Explicit Route Objects (EROs) for a connection. The path computation utilizes different traffic parameters, such as protection types, service classes, cost of abstract and E-NNI links, and the like, to find a lowest cost path. Note the path computation can be used to set up any connection type (e.g. SONET/SDH, Ethernet, or the like). Disadvantageously, path computation and ASON database mechanism do not currently exist for ASON networks. With regard to building the ASON Database, this information is never persisted and is discovered dynamically each time and updated whenever the topology is changed (added/modified/deleted). All Domains except the internal domain are treated as remote domains. If there is a mismatch in any link configuration, such links are disregarded for path computation resulting in easy diagnosis for the operator to find misconfigurations.

Also, the current standards talk about setting up of multi-layer connections in a broader sense. Disadvantageously, current standards do not specify how to achieve hitless connection setups, mesh restoration, and how to bundle the connections under VCAT layer and route them as well as the behavior during mesh restoration. Also note that at higher layers Ethernet and VCAT, there is no physical resource that is tied and hence there should be a virtual resource that should be available to keep the connection active. The connection at Ethernet Layer should be able to create and delete VCGs dynamically in the ASON Networks whenever the connection is serviced.

In GMPLS world, when two nodes conflict on a resource while setting up the connection, a PATH message carries label Set or explicit label information for negotiation to its down stream node. Later, based on the label information in RESV message sent from the down stream node, upstream node selects a label (Resource) based on availability at its side, else rejects this request. In networks where each network supports a single node it is easy to establish label negotiation supporting above scenario where the cross connects could be created when RESV is received and the resource is available. In scenarios where the network includes a large number of nodes and the connection has to traverse across many nodes through in-band communication and connection setup is done at the border node of the network, it is hard for such a label negotiation to succeed and currently there is no mechanism to support that for a originating node to create such connections.

The current approach visualizes border node which receives the incoming request to create a subtended node connection (SNC) to terminate on a virtual connection point (VCP) which is a logical entity created by this connection at the terminating border node. At this point the PATH message is forwarded to the next domain. Later after receiving the RESV message from down stream node, based on the resource availability (for the label passed in RESV message) cross connect is created with the new resource and this logical entity and the RESV message is forwarded to the originating border node via in-band communication. Such a connection is also supported to recover from persistence across reboots. The existing architectures fail here because an SNC can resolve its resources internally in the I-NNI domain but when it comes to reserve the resource at border node, it is hard to identify the label. For example, as in a typical telecom network, this timeslot/bandwidth (resource) may be in use by other node across the E-NNI link.

BRIEF SUMMARY OF THE INVENTION

In various exemplary embodiments, the present invention provides systems and methods for connections on an ASON network including an ASON database and path computation algorithm, mechanisms for Ethernet connections over ASON, and mechanisms for label negotiation for SNCs. Advantageously, the present invention provides mechanisms for ASON path computation and virtual topology management, Ethernet connection establishment, modification, and deletion in ASON networks, and label negotiation without requiring binding and releasing of connections before label negotiation.

In an exemplary embodiment of the present invention, an Automatically Switched Optical Network (ASON) includes a plurality of nodes in a domain, wherein each of the plurality of nodes includes one of a border node and an interior node, a routing controller located at a node of the plurality of nodes, a plurality of internal Network Node Interface (I-NNI) links interconnecting the plurality of nodes, one or more external Network Node Interfaces (E-NNI) at each border node, wherein the external Network Node Interface connects to a node in another domain, a client connected to a node of the plurality of nodes with a User to Network Interface (UNI), and an ASON database at each of the plurality of nodes including topology and routing information, wherein the topology and routing information in the ASON database at each of the plurality of nodes is synchronized through the I-NNI links, and the node connected to the client receives E-NNI and UNI provisioning from the client and stores it in the ASON database at the node connected to the client and forwards the provisioning to other nodes of the plurality of nodes through the plurality of I-NNI links. The node with the routing controller is configured to receive abstract link and neighbor domain provisioning from the client and store the abstract link and neighbor domain provisioning in the ASON database at the node with the routing controller. The node with the routing controller is configured to receive neighbor domain topology information through the one or more E-NNIs at each border node through the Domain to Domain Routing Protocol.

The ASON database includes a Transport Network Address (TNA) tree maintaining an index of all TNAs in the ASON, a Local Domain tree maintaining an index of all of the plurality of nodes in the domain, and a Remote Domain tree maintaining an index of all of a second plurality of nodes in all remote domains connected to the domain through the one or more E-NNIs, wherein each of the plurality of nodes and the second plurality of nodes includes a link list listing all links originating or terminating at each of the plurality of nodes and the second plurality of nodes and a second link list listing all TNAs connected to each of the plurality of nodes and the second plurality of nodes, and each link in the link list and the second link list includes a protection type, cost, and metrics.

Optionally, the ASON further includes a network element controller at each of the plurality of nodes in communication with the ASON database, wherein the network element controller is configured to implement a path computation algorithm using the ASON database. The path computation algorithm includes checking for destination TNA in the ASON database, determining the node of the plurality of nodes and the second plurality of nodes that hosts the TNA, if an Explicit Route Object (ERO) exists, validating the ERO from a current node to a last node which is hosting the TNA, and using a service level constraint to ensure the ERO includes the right protection type to provide service, and if no ERO exists, traversing through all links in the link list and the second link list to get a shortest path based on a constraint. Optionally, the constraint includes one of lowest cost, service class, link protection type, and a combination thereof.

Each of the plurality of nodes and the client are configured to request an Ethernet connection in the ASON, wherein the request includes one of creating, deleting, increasing bandwidth, and decreasing bandwidth of the Ethernet connection. Each of the creating, deleting, increasing bandwidth, and decreasing bandwidth of the Ethernet connection request include a sequence of message flows across Ethernet, Virtual Concatenation, and SONET layers of the Automatically Switched Optical Network. Optionally, each of the plurality of nodes which are border nodes is configured to provide label negotiation of a sub network connection during set up of a connection.

In another exemplary embodiment of the present invention, a method of handling Ethernet connections in an ASON includes receiving at an ingress node one of an Ethernet PATH message and a soft permanent connection request from a client and performing associated Ethernet layer setup, sending at the ingress node a Virtual Concatenation layer soft permanent connection request to the egress node and performing associated Virtual Concatenation layer setup, sending at the ingress node a SONET layer soft permanent connection request to the egress node and performing associated SONET layer setup, receiving at the egress node a SONET PATH message and performing associated SONET layer setup, receiving at the ingress node and the egress node a SONET RESV message and performing associated SONET layer setup, receiving at the ingress node and the egress node a Virtual Concatenation layer RESV message and performing associated Virtual Concatenation layer setup, receiving at the egress node an Ethernet PATH message and performing associated Ethernet layer setup, and receiving at the ingress node and the egress node an Ethernet RESV message and performing associated Ethernet layer setup.

Optionally, the method of handling Ethernet connections further includes receiving a request for increased bandwidth including one of an Ethernet PATH message and a soft permanent connection request from the client, and exchanging messages between the ingress node and the egress node at the Ethernet layer, Virtual Concatenation layer, and SONET layer to provide increased bandwidth. Alternatively, the method of handling Ethernet connections further includes receiving a request for decreased bandwidth including one of an Ethernet PATH message and a soft permanent connection request from the client, and exchanging messages between the ingress node and the egress node at the Ethernet layer, Virtual Concatenation layer, and SONET layer to provide decreased bandwidth. The method of handling Ethernet connections can further include receiving a request for originating client deletion including one of an Ethernet PATH delete message and a soft permanent connection deletion request from the client, and exchanging messages between the ingress node and the egress node at the Ethernet layer, Virtual Concatenation layer, and SONET layer to provide originating client deletion. Optionally, the method of handling Ethernet connections further includes receiving a request for connection deletion including one of an Ethernet RESV delete message and a soft permanent connection deletion request from the client, and exchanging messages between the ingress node and the egress node at the Ethernet layer, Virtual Concatenation layer, and SONET layer to provide connection deletion.

In yet another exemplary embodiment of the present invention a network utilizing ASON for connections includes a plurality of nodes in an ASON domain, wherein each of the plurality of nodes include one of a border node and an interior node, a routing controller located at a node of the plurality of nodes, a plurality of I-NNI links interconnecting the plurality of nodes, one or more E-NNI at each border node, wherein the E-NNI connects to a node in another domain, a client connected to a node of the plurality of nodes with a UNI, an ASON database at each of the plurality of nodes including topology and routing information, and means for updating the ASON database. Optionally, the network further includes means for computing a shortest path through the plurality of nodes for one of a switched connection and a soft permanent connection, wherein the means for computing utilizes one of more of the ASON databases. The means for computing a shortest path utilizes one of lowest cost, service class, link protection type, and a combination thereof as a constraint. Alternatively, the network of further includes means for setting up an Ethernet connection over the plurality of nodes, means for increasing bandwidth of the Ethernet connection, means for decreasing bandwidth of the Ethernet connection, means for deleting an originating client of the Ethernet connection, and means for deleting a terminating client of the Ethernet connection. Optionally, the network of further includes means for label negotiation of a sub network connection during setup of a connection.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides systems and methods for connections on an ASON network including an ASON database and path computation algorithm, mechanisms for Ethernet connections over ASON, and mechanisms for label negotiation for SNCs. Advantageously, the present invention provides mechanisms for ASON path computation and virtual topology management, Ethernet connection establishment, modification, and deletion in ASON networks, and label negotiation without requiring binding and releasing of connections before label negotiation.

Figure 1:
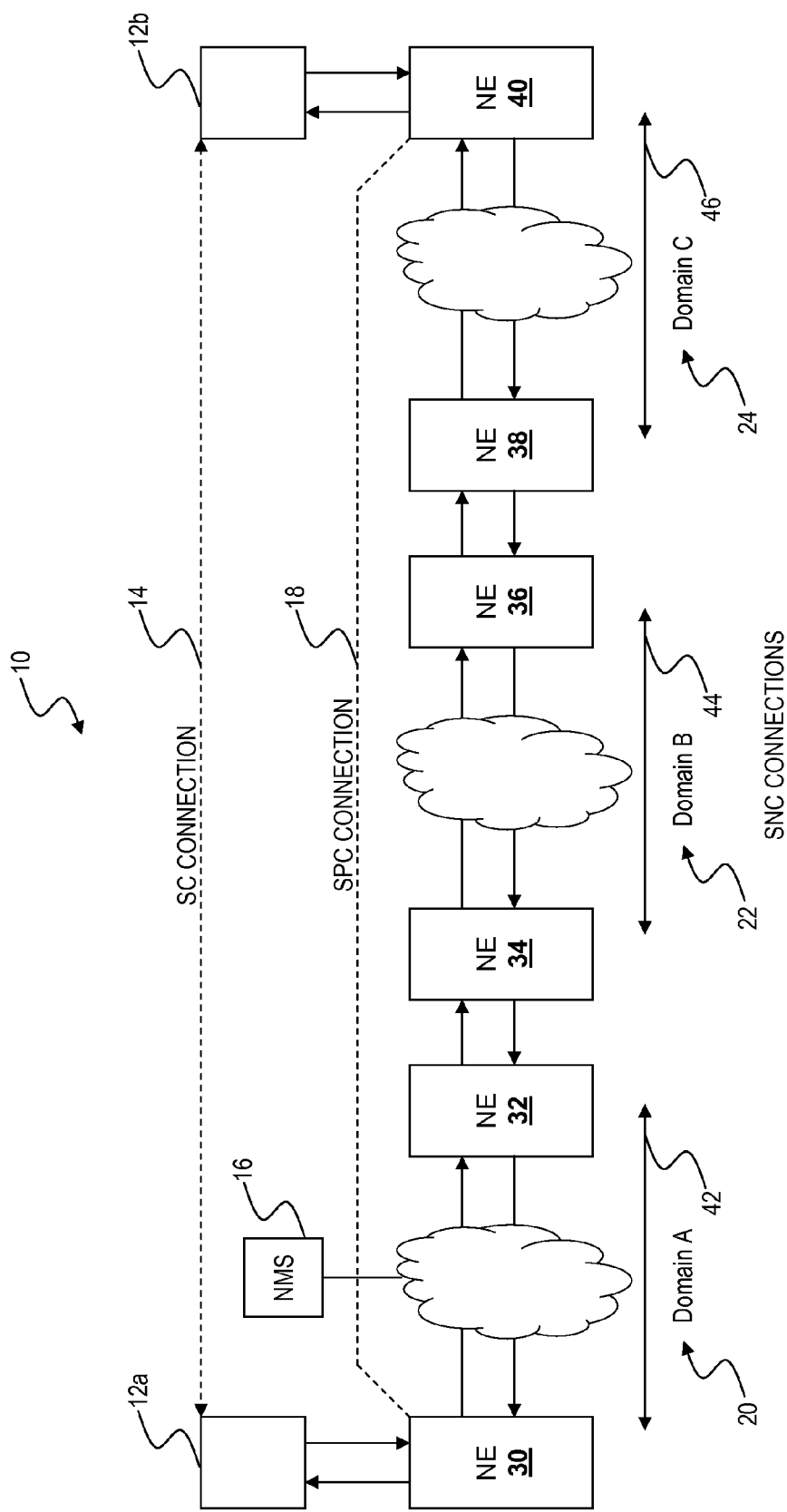
FIG. 1 is a network diagram illustrating an exemplary ASON network with three control domains.
Figure 2:
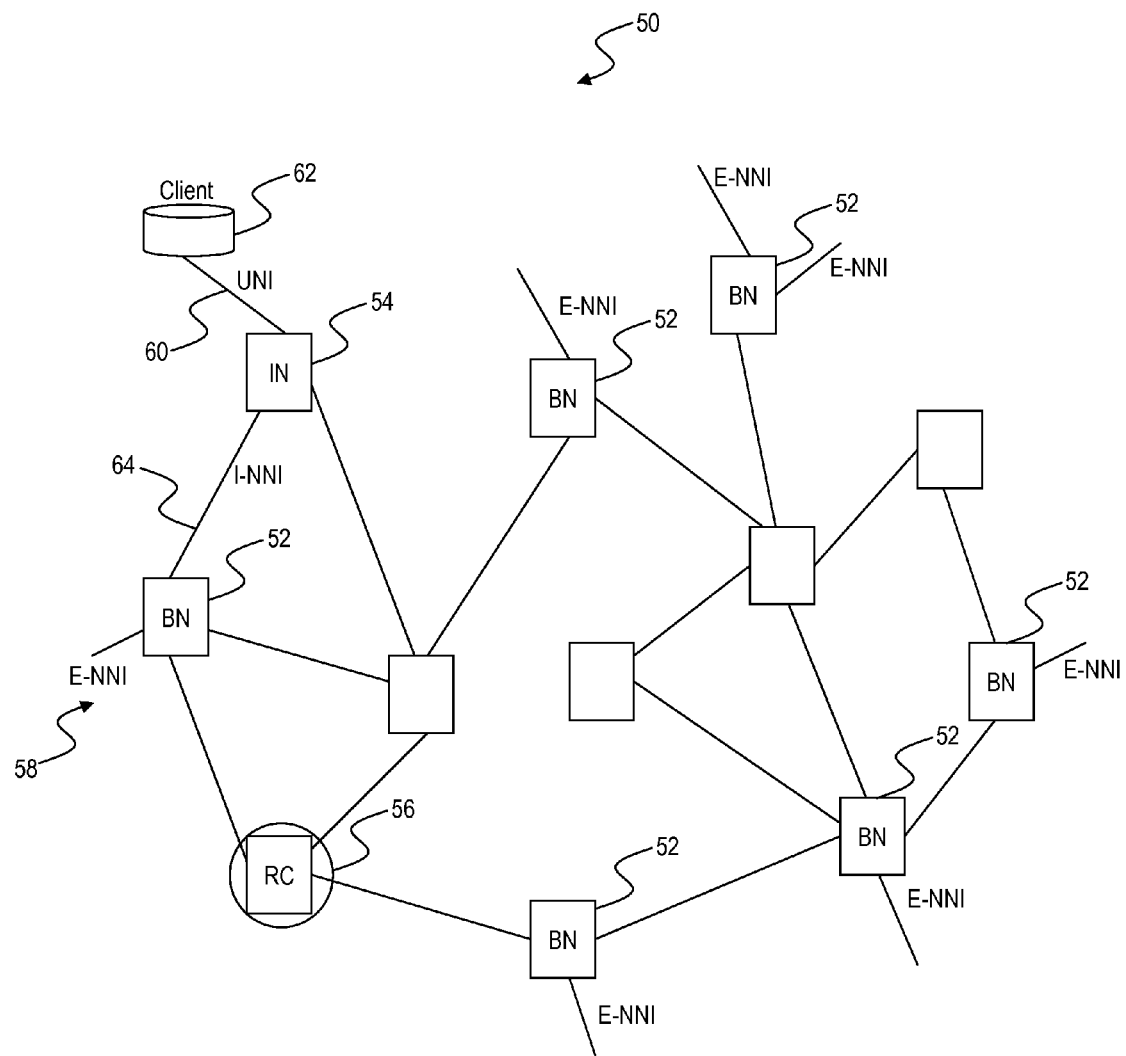
FIG. 2 is a network diagram illustrating a domain in an ASON network, according to an exemplary embodiment of the present invention.

Referring to FIG. 2, an ASON network 50 is illustrated according to an exemplary embodiment of the present invention. The network 50 includes multiple optical cross-connect (OXC) network elements physically interconnected in a domain. The multiple OXCs are functioning under ASON as border nodes 52, interior nodes 54, and routing controllers (RCs) 56. Additionally, the network 50 can include pseudo nodes (not shown). Pseudo nodes are virtual nodes that have no corresponding real node in the internal physical topology, and are only used for external advertisement purposes to other control domains or networks.

The network 50 includes E-NNI 58 and UNI 60 control plane messaging interfaces. The UNI 60 interface is used when accessed from a client device 62, and the E-NNI 58 interface is used between control domains. For example, the network 50 represents a single control domain with multiple E-NNI 58 interfaces to other domains (not shown). The border node 52 is a node that hosts at least one E-NNI 58 interface. The RC 56 is not part of the physical topology, and is responsible for routing dissemination. The interior node 54 is a node which does not host any E-NNI 58 interfaces. Intra-network communication of control plane messaging is conducted using an internal Network Node Interface (I-NNI) 64 within the network 50.

The ASON Domain to Domain Routing Protocol (DDRP) allows a particular network or control domain (e.g., network 50) to advertise a virtualized topology to other networks or control domains (e.g., through the E-NNI 58 interfaces) in order to reduce the complexity of advertising. The virtual topology is disclosed in commonly-assigned U.S. patent application Ser. No. 10/961,229, filed on Oct. 12, 2004, and entitled "SCALABLE ABSTRACTION OF TOPOLOGY ACROSS DOMAIN BOUNDARIES," and the contents of which are incorporated in-full by reference herein. Further, DDRP allows policy control over the information leaked to other networks about the true arrangement of links and nodes within the network.

This topology in current standards is advertised in three Link State Advertisement (LSA) updates including Routing Controller LSA, Transport Network Address (TNA) LSA, and Link LSA covering both E-NNI links and abstract link updates. The TNA represents a client address. These updates are directed towards remote RCs (i.e., RCs 56 in different domains) and are received at those active remote RCs. This information can be kept as centralized information on that domain or distributed within that domain. This centralized information is available to do any kind of Path computation. This path computation result can be used to build EROs (Explicit Route Objects) for a connection. The path computation can use different traffic parameters such as the protection types, service classes, and cost of abstract and ENNI links to find a lowest cost path.

In an exemplary embodiment of the present invention, the present invention provides a database and path computation engine for maintaining abstract topology configurations and building and validating EROs for connections. The path computation engine utilizes multiple constraints associated with each link and stored in the database. For example, the constraints can include maximum cost, wavelength availability, service class, and the like. Advantageously, the present invention provides a centralized mechanism to dynamically create and update the database based on advertised information and a centralized mechanism to build and validate EROs. The path computation can be used to create Ethernet as well as SONET/SDH connections.

While virtualized topologies allow considerable flexibility in how a domain, such as network 50, advertises its resources to other networks or domains, it is important for each ASON node 52,54 within the domain have this virtual topology information so that they could route the connections within and across I-NNI 64 interfaces based on this information and also announce the virtual topologies link state and link bandwidth updates to the active RC 56 of that local domain. This allows the network administrator to implement policies that support some type of control over how connections could be routed within the I-NNI 64 topology. This also can be manipulated to control aspects of requests from other networks, for example, to indicate to other networks that some paths are temporarily or permanently unavailable and thereby stop other networks from requesting services that would utilize these paths.

Figure 3:
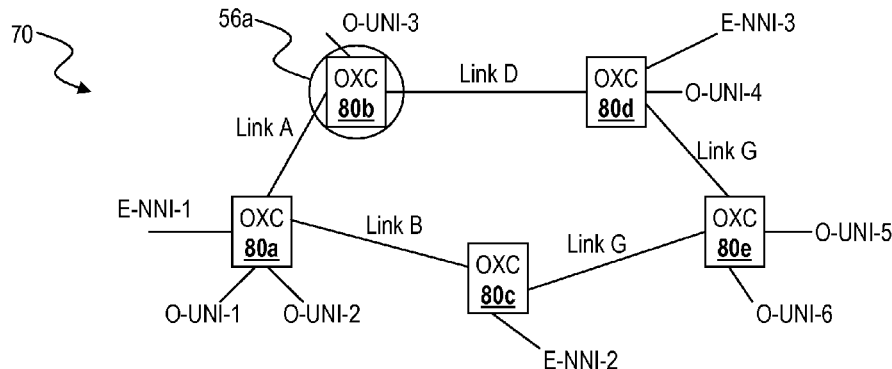
FIG. 3 is a network diagram illustrating three levels of the ASON domain in FIG. 2 including a physical topology, an abstract topology, and abstract topology advertisements, according to an exemplary embodiment of the present invention.
Figure 3:
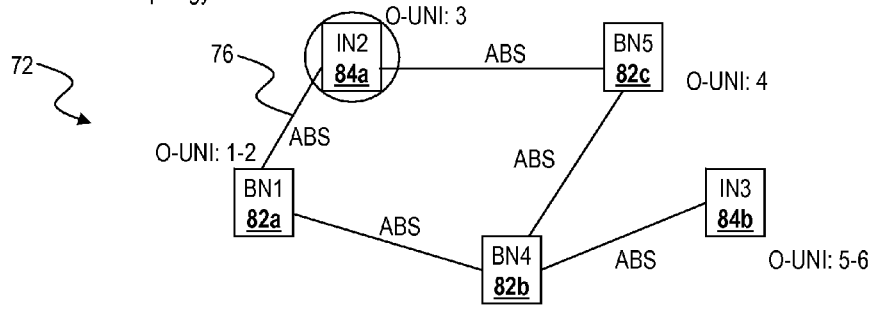
Figure 3:
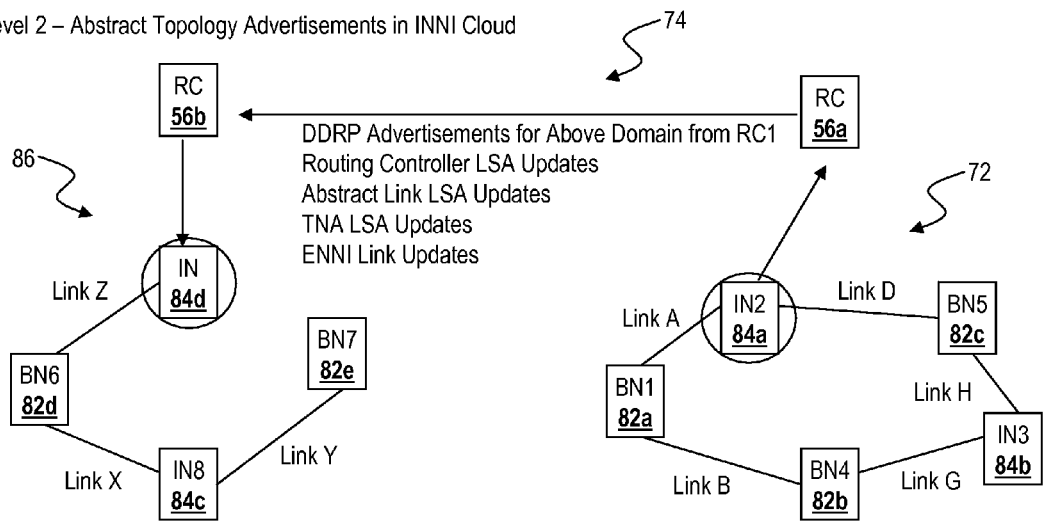

Referring to FIG. 3, three levels including physical topology 70, abstract topology 72, and abstract topology advertisements 74 are illustrated for ASON abstract topology propagation in an I-NNI cloud. The physical domain 70 represents the domain's actual physical topology and includes multiple interconnected OXCs 80a-e. The OXC 80a includes an E-NNI interface (E-NNI-1) and two O-UNI interfaces (O-UNI-1,2). The OXC 80b includes an O-UNI interface (O-UNI-3). The OXC 80c includes an E-NNI interface (E-NNI-2). The OXC 80d includes an E-NNI interface (E-NNI-3) and an O-UNI interface (O-UNI-4), and the OXC 80e includes two O-UNI interfaces (O-UNI-5,6). The OXC 80b includes a RC 56a.

The abstract topology 72 represents a virtual topology of the physical topology 70. This abstract topology 72 is advertised to other networks or control domains. Note, the abstract topology 72 represents a domain. The abstract topology 72 includes a border node (BN) 82a which represents OXC 80a, an interior node (IN) 84a which represents OXC 80b, a BN 82b which represents OXC 80c, a BN 82b which represents OXC 80d, and an IN 84b which represents OXC 80e. The various nodes 82,84 are interconnected through abstract links 76. For example, systems and methods for abstracting a network topology into virtualized links are described in commonly-assigned U.S. patent application Ser. No. 11/584,227 filed on Oct. 10, 2006, and entitled "SYSTEM AND METHOD FOR SUPPORTING VIRTUALIZED LINKS AT AN EXTERIOR NETWORK-TO-NETWORK INTERFACE," and the contents of which are incorporated in-full by reference herein.

The abstract topology advertisements 74 illustrate advertisements in the I-NNI cloud from the abstract topology 72 to another domain 86. The domain 86 represents a second physical network of OXCs operating as BNs 82d-e and IN 84c-d. The RC 56a is configured to provide DDRP advertisements from the abstract topology 72 to the domain 86. Additionally, LSA updates in the form of routing controller, abstract link, TNA, and E-NNI link updates are provided from the RC 56a to the RC 56b.

With regard to the abstract topology (domain) 72, the interactions include: BNs 82b-c and INs 84a-b receiving O-UNI-1-2 information through an ASON TNA Information Group (IG) from BN 82a and receiving E-NNI-1 information through an ASON Link IG from BN 82a, 82a,b,c and IN 84b receiving O-UNI-3 information through an ASON TNA IG from IN 84a, BN 84a,b and IN 84a,b receiving E-NNI-3 information through an ASON Link IG from BN 82c and receiving O-UNI-4 information trough an ASON TNA IG from BN 82c, BN 82a,b and IN 84a receiving O-UNI-6 information through an ASON TNA IG from IN 84b, and BN 82a,c and IN 84a,b receiving E-NNI-2 information through an ASON Link IG from BN 82b. The Abstract links ABS 76 are configured on the RC 56a and are sent to BN 82a,b,c and IN 84b via an ASON Link IG from IN 84a (which hosts RC 56a). Physical Node (PN) Information is sent to BN 82a,b,c and IN 84b via an ASON RC IG from IN 84a (which hosts RC 56a).

In the second domain 86, interactions from the domain 72 are updated as the RC 56b receives DDRP advertisements from the RC 56a, and the RC 56b accordingly provides TSA LSA updates via an ASON TNA IG to BN 82d,e and IN 84c,d, Link LSA updates via an ASON Link IG to BN 82d,e and IN 84c,d, and RC LSA updates via an ASON RC IG to BN 82d,e and IN 84c,d. Also, the same behavior happens for DDRP advertisements from the domain 86 to the domain (topology) 72.

Figure 4:
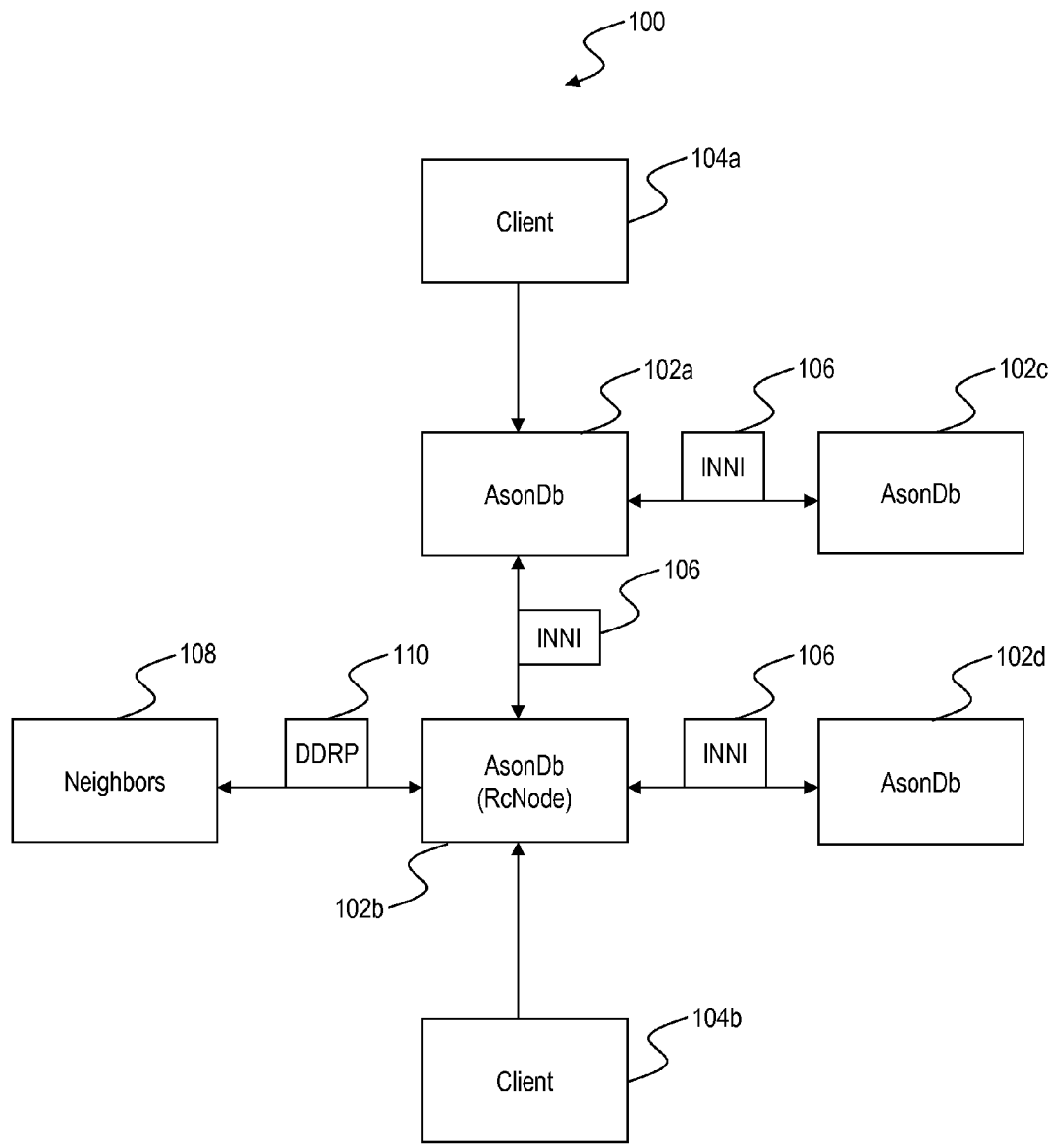
FIG. 4 is a block diagram illustrating interactions ASON databases (AsonDb) according to an exemplary embodiment of the present invention.

Referring to FIG. 4, interaction 100 of an ASON database (AsonDb) 102 is illustrated according to an exemplary embodiment of the present invention. The ASON database 102 maintains all topology information of the whole network with end to end routing information. For example, ASON databases 102a-d can be located at each node (i.e., OXC) in the network including ASON database 102b at an RC node. The ASON database 102a receives E-NNI and O-UNI link provisioning from a client 104a, and saves it to the local database 102a. Also, this information is forwarded to other databases 102b,c,d through I-NNI interfaces 106.

At the RC node, the ASON database 102b receives Abstract link and neighbor domain provisioning from a client 104b, keeps the information in the local database 102b, forwards it to the other nodes in the local domain using the I-NNI interfaces 106, and sends local domain topology to its neighbor domains 108. The RC node gets its neighbor topology from its neighbors 108 via DDRP 110, saves it in the local database 102b, and forwards it to other local nodes via the I-NNI interface 106. Accordingly, every node in the local domain has the same topology information, and they are synced via an I-NNI cloud.

The ASON databases 102a-d can be stored in a data store unit within each node or operatively connected to each node. For example, the nodes can include OXCs with network element controllers, and each network element controller can include memory in which the ASON databases 102a-d can be stored. Also, the network element controller can be configured to implement the path computation algorithm described herein in FIG. 6.

Figure 5:
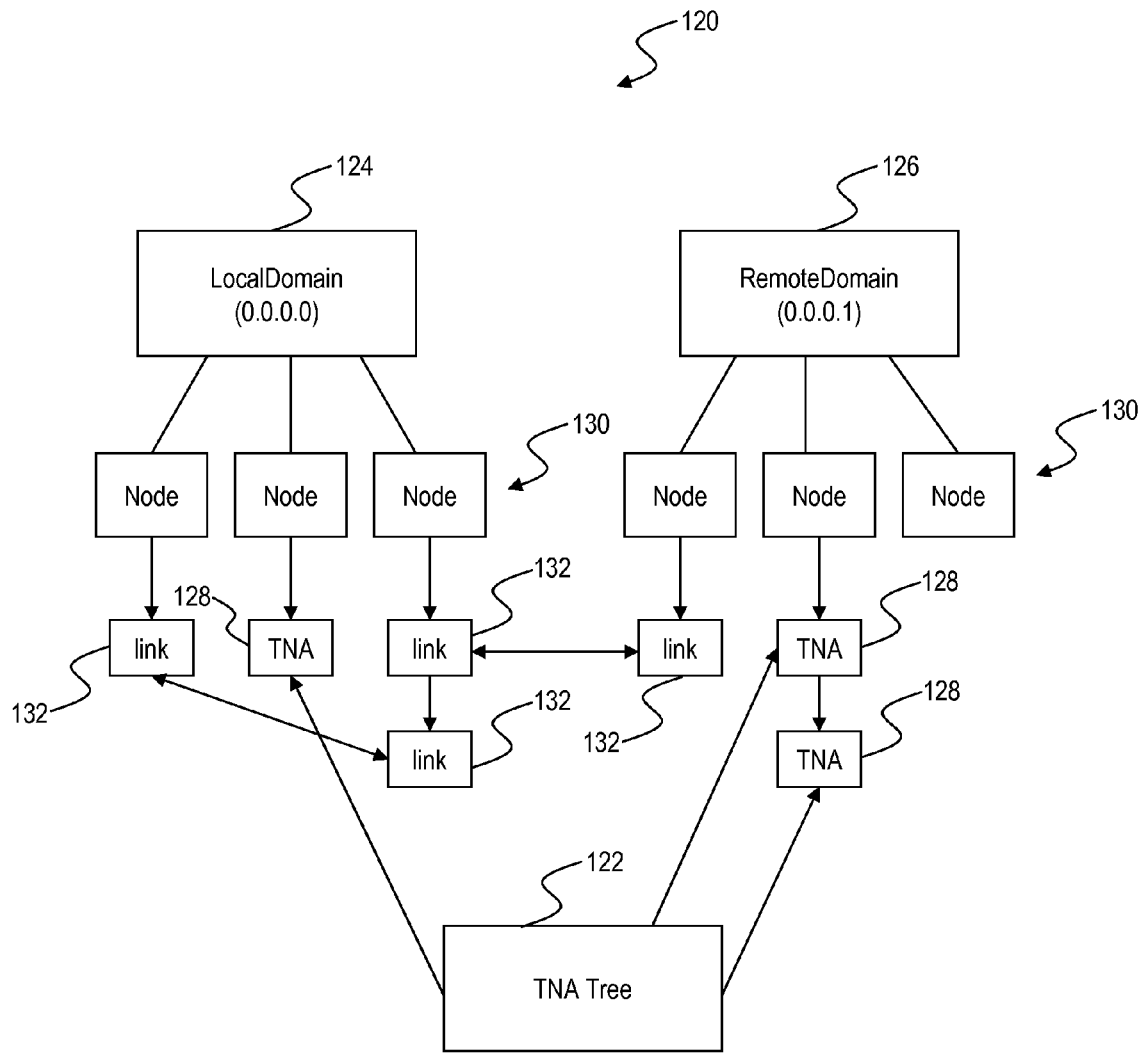
FIG. 5 is a block diagram illustrating the organization of an ASON database according to an exemplary embodiment of the present invention.

Referring to FIG. 5, organization of an ASON database 120 is illustrated, according to an exemplary embodiment of the present invention. The ASON database 120 includes a TNA tree 122, a local domain tree 124, and a remote domain tree 126. The ASON database 120 includes an indexed list of all TNAs 128, nodes 130, and links 132 in an ASON network. The TNA tree 122 maintains all TNAs 128 in the network. For example, the TNA tree 122 can be indexed by TNA 128 Internet Protocol (IP) address or the like.

The local domain tree 124 maintains all nodes 130 with a local domain of the ASON network. Similarly, for example, the local domain tree 124 can be indexed by the node's 130 IP address. The remote domain tree 126 maintains all nodes 130 in all remote domains of the ASON network. Also, the remote domain tree 126 can be indexed by the node's 130 IP address. In the ASON database 120, every node 130 has a link list 132 listing all links originating or terminating on the node, every node 130 has the link list 132 listing all TNAs 128 connected to this node 130, every link 132 is linked to its reverse side link 132, and each link 132 has a protection type of the link associated with it along with the cost and other metrics. The protection type, cost, and other metrics are utilized in a path computation algorithm for establishing connections.

Figure 6:
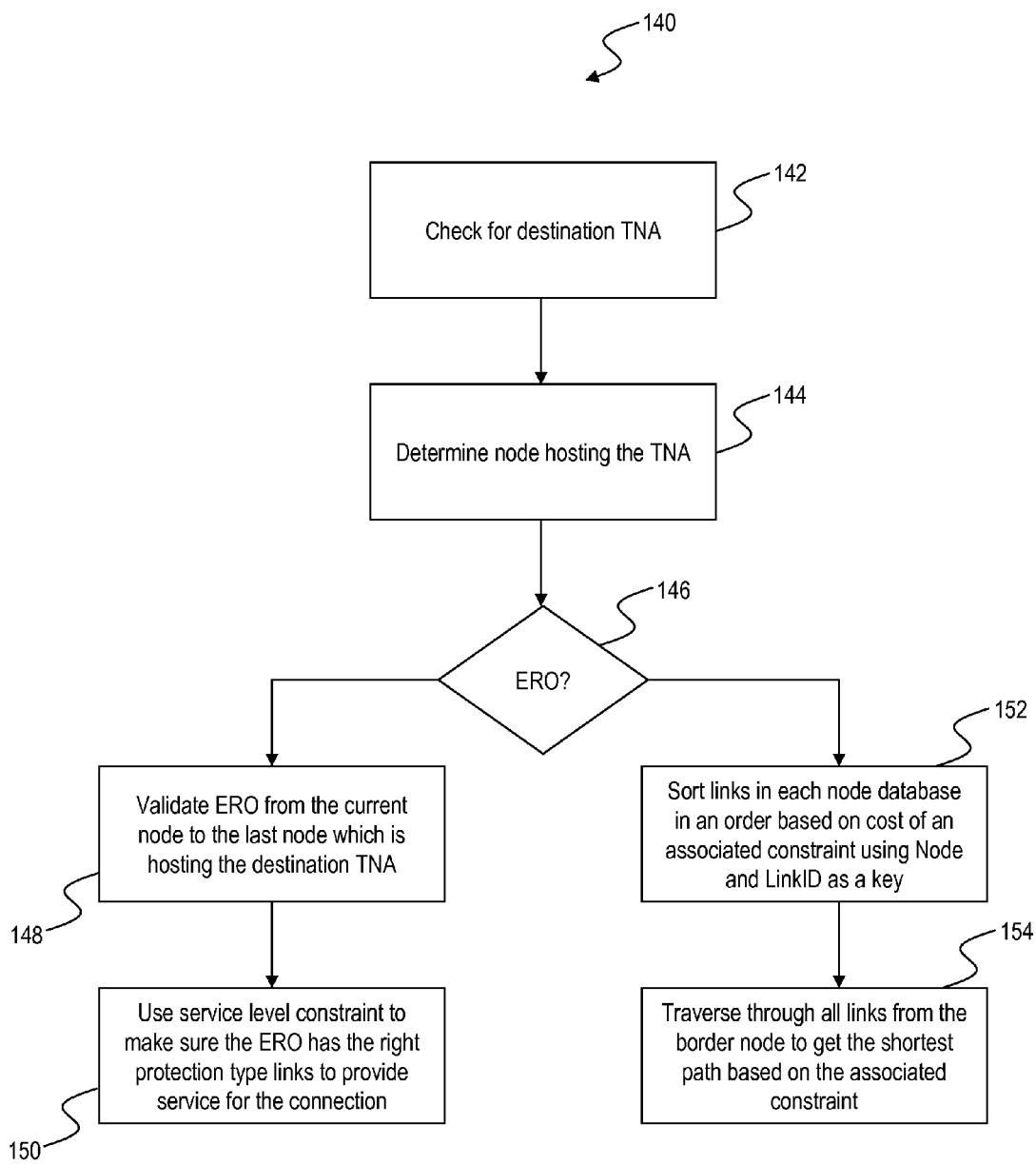
FIG. 6 is a flowchart illustrating a path computation algorithm which can be used on the ASON database, according to an exemplary embodiment of the present invention.

Referring to FIG. 6, a flowchart illustrates a path computation algorithm 140 which can be used on the ASON database, according to an exemplary embodiment of the present invention. The path computation algorithm 140 is configured to compute a shortest path through an ASON network based on different constraints, such as cost, service class, and the like. Additionally, the output of the path computation algorithm 140 can be used as an ERO.

The path computation algorithm 140 starts with checking for a destination TNA address (step 142). The destination TNA address represents the end client associated with a connection request, and this address is queried in the ASON database. The node hosting the TNA is determined (step 144). Again, this information is determined based on a query of the ASON database. The path computation algorithm 140 can operate with or without an ERO (step 146).

If an ERO exists (step 146), then the ERO is validated from the current node to the last node which is hosting the destination TNA (step 148). Next, a service level constraint is used to make sure the ERO has the right protection type links to provide service for the connection (step 150). Following step 150, the path computation algorithm 140 outputs a computed path.

If an ERO does not exist (step 146), then the path computation algorithm 140 sorts links in each node database in an order based on cost of an associated constraint using Node and LinkID as a key (step 152). Here, the path computation algorithm 140 utilizes the ASON databases in each node to determine a path through the network based on constraints. The path computation algorithm 140 traverses through all links from the border node to get the shortest path based on the associated constraint (step 154).

An exemplary operation of the path computation algorithm 140 can include checking for a given destination TNA. Next, the path computation algorithm 140 gets the node hosting the destination TNA and domain information from this node all from the ASON database. From the current node, the path computation algorithm 140 gets the first link at lowest cost and goes to a next node. The first link and next node information are stored in the local database. At the next node, the path computation algorithm 140 checks to see if this next node matches the destination node, and if so, ends. If not, the path computation algorithm 140 checks to see if the domain of this node matches the domain of the destination node. If the domains match, then the destination node should be in this domain. The path computation algorithm 140 continues, and at each step, runs constraints to match links and sorts them in ascending order of costs. The output of the path computation algorithm 140 is a shortest path through the ASON network providing links and nodes based on associated constraints.

In general, the path computation algorithm 140 and ASON databases allow a network operator to view actual topology within their domain or on any domain where the present invention is implemented. The present invention treats all domains as remote domains except the internal domain. If there is a mismatch in any link configuration, such links are disregarded for path computation resulting in easy diagnosis for the operator to find misconfiguration. The present invention can compute paths based on lowest cost, service class, link protection types, and the like. Also, the present invention can perform ERO validation based on service classes in the ASON database. Path eligibility flags could be used for diversity and eligibility calculations at run time of the path computation algorithm. Advantageously, ERO validations and cyclic checks are easy to find, and the present invention provides the ability to control and segment the network based on different service class connections. Also, the present invention provides a service class feature on end-to-end connections across different domains for both SC and SPC connections.

Figure 7:
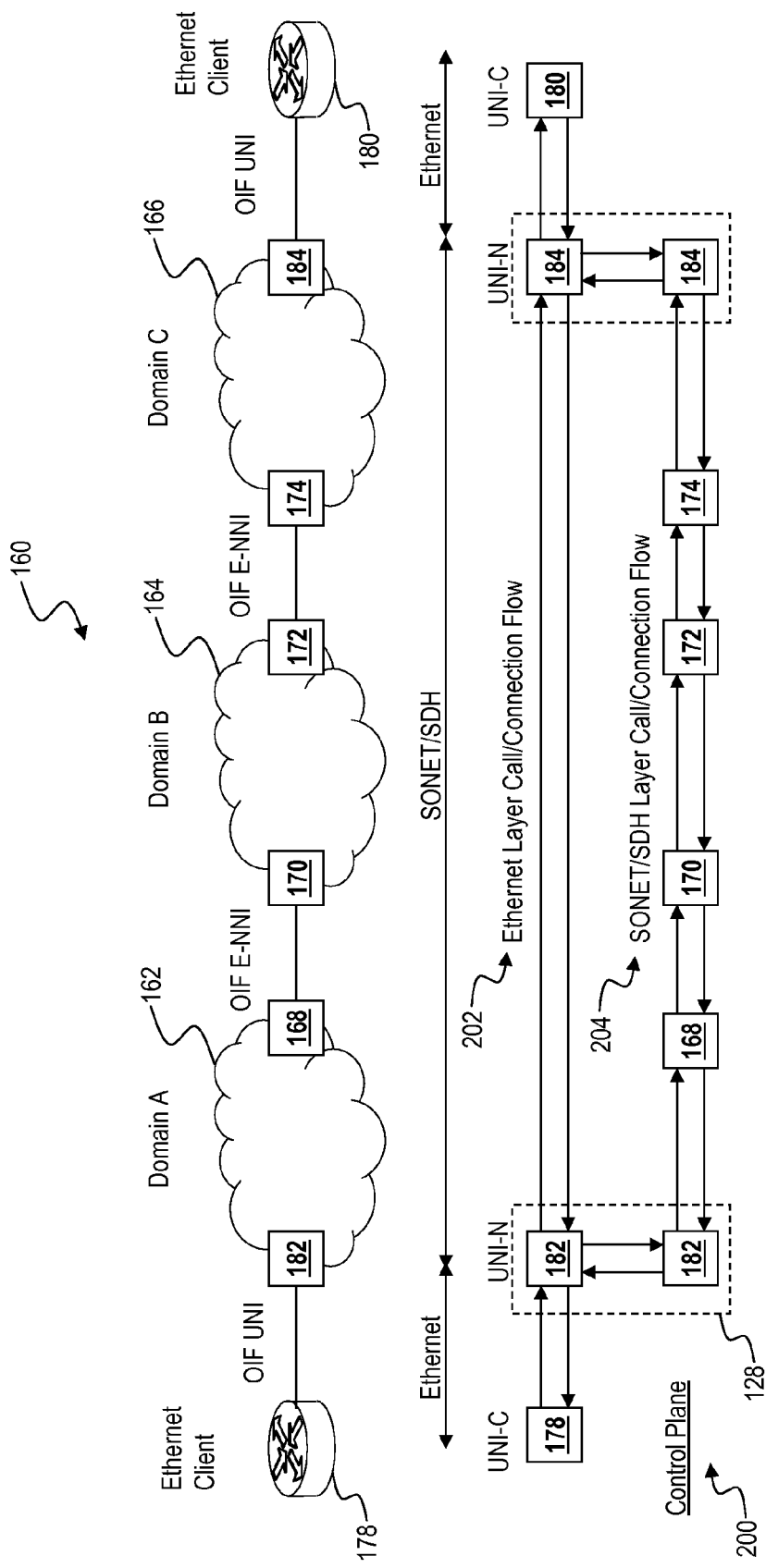
FIG. 7 is a network diagram illustrating Ethernet and SONET/SDH connections an ASON network according to an exemplary embodiment of the present invention.

Referring to FIG. 7, Ethernet and SONET/SDH connections are illustrated over an ASON network 160 according to an exemplary embodiment of the present invention. The ASON network 160 includes three control domains: carrier domain A 162, B domain 164, and C domain 166. Each of the domains 162,164,166 includes a plurality of interconnected nodes, such as OXCs. The domain A 162 includes a node 168 interconnected to a node 170 in domain B 164 utilizing an OIF E-NNI interface. The domain B 162 includes a node 172 interconnected to a node 174 in domain C 166 utilizing an OIF E-NNI interface. As described herein, the OIF E-NNI interfaces allow the domains 162,164,166 to advertise their topologies to each other.

As described herein, connection services can be requested originally from either a client device 178,180 (in which case it is called a Switched Connection) or a management system interface (in which case it is called a Soft Permanent Connection), and the requesting entity can be either part of any domain 162,164,166 or part of an exterior network. These connections can be for SONET/SDH or Ethernet Resources. In case of an Ethernet connection request, the connection has to be created in a multi layer fashion with PATH Messages for Ethernet, VCAT, and SONET/SDH layers. In this exemplary network 160, the clients 178,180 include Ethernet-capable router, switches, or the like. The client 178 is connected to a node 182 in the domain A 162 through an OIF UNI interface, and the client 180 is connected to a node 184 in the domain C through an OIF UNI interface.

FIG. 7 illustrates an Ethernet layer connection in the ASON network 160. At higher layers Ethernet and VCAT, there is no physical resource (i.e. node) that is tied and hence there should be a virtual resource that should be available to keep the connection active. The connection at Ethernet Layer is able to create and delete Virtual Circuit Groups (VCGs) dynamically in the ASON Network 160 whenever the connection is serviced. Note that only ingress and egress network end nodes 182,184 aware of Ethernet and VCAT layer and all other nodes are just SONET layer aware.

An ASON control plane 200 is utilized to provide Ethernet layer call/connection flow 202 and SONET/SDH layer call/connection flow 204 through the domains 162,164,166. Additionally, a VCAT layer call/connection flow (not shown) can be utilized between the Ethernet 202 and SONET/SDH 204 layers. The control plane 200 allows the client 178 to utilize an UNI-C connection to the node 182 to request services, such as an Ethernet connection. The present invention can utilize the ASON database described herein to establish a path through domain A 162, domain B 164, and domain C 166 to the destination client 180 based on the destination client's 180 TNA address and the node/link information in the ASON database.

In an exemplary embodiment of the present invention, the present invention includes implementation details on Ethernet connection setup in the ASON network 160. The present invention provides hitless connection setup and mesh restoration. Also, the present invention allows bundling of connections under a VCAT layer by generating the same ERO for all the lower level SONET/SDH connections and routing them on a same physical covers. The present invention also provides guidelines on future enhancements for mesh restoration using one single bundle at the VCAT layer for SONET/SDH connection failures. The present invention covers creating and deleting VCGs dynamically in the ASON network 160 whenever the connection is serviced along with dynamic bandwidth allocation and deallocation.

Referring to FIGS. 8-12, exemplary embodiments are illustrating for different message flow associated with SC and SPC Ethernet connection support according to an exemplary embodiment of the present invention. These message flows illustrate how to implement Ethernet connection setup in ASON networks along with behavior details. The message flows described herein provide multi-layer (e.g., Ethernet, VCAT, SONET/SDH) support. Also, the present invention utilizes path computation at each layer based on service class using the ASON database and path computation algorithm described herein. For example, for the Ethernet and VCAT layers, the required bandwidth can be set to 0, so the path computation always succeeds.

The present invention provides for bundling of SONET connections at VCAT layer to use the same path during setup as well as during mesh restoration. The present invention provides interaction with Link Capacity Adjustment Scheme (LCAS) for hitless setup and mesh restoration as well as providing hitless setup for clients that do not support LCAS (by setting up connections when RESV message is received for SONET connections). The mechanisms described herein provide for various upstream label support at Ethernet, VCAT and SONET/SDH layers, conversion of Ethernet bandwidth to SONET/SDH size granularity, dynamic creation and deletion VCAT groups, dynamic addition and removal of VCAT members within an VCAT to avoid hitless bandwidth modification, creation and deletion of virtual resource for Ethernet and VCAT layers, updating virtual resource during bandwidth modification at Ethernet and VCAT layers, using virtual resource to keep the connection active, embedding of computed ERO for SONET Layer Path Message, and retrieving of Record Route Object (RRO) from PATH and RESV messages at SONET Layer.

FIGS. 8-12 illustrate message flows through an ASON network 300 for an Ethernet connection setup, Ethernet bandwidth increase and decrease, originating client (SC/SPC) deletion, and terminating client (SC/SPC), according to an exemplary embodiment of the present invention. The ASON network 302 includes an Ethernet layer Network Call Controller (NCC) 304, VCAT layer NCCs 306,308, Service layer NCCs 310,312, and a client layer NCC 314. Generally, the NCCs 304-314 are configured to provide services across the ASON network 300 at the associated layer. The various message flows show a connection from an Ingress UNI-N to an Egress UNI-N point in the ASON network 300.

Figure 8:
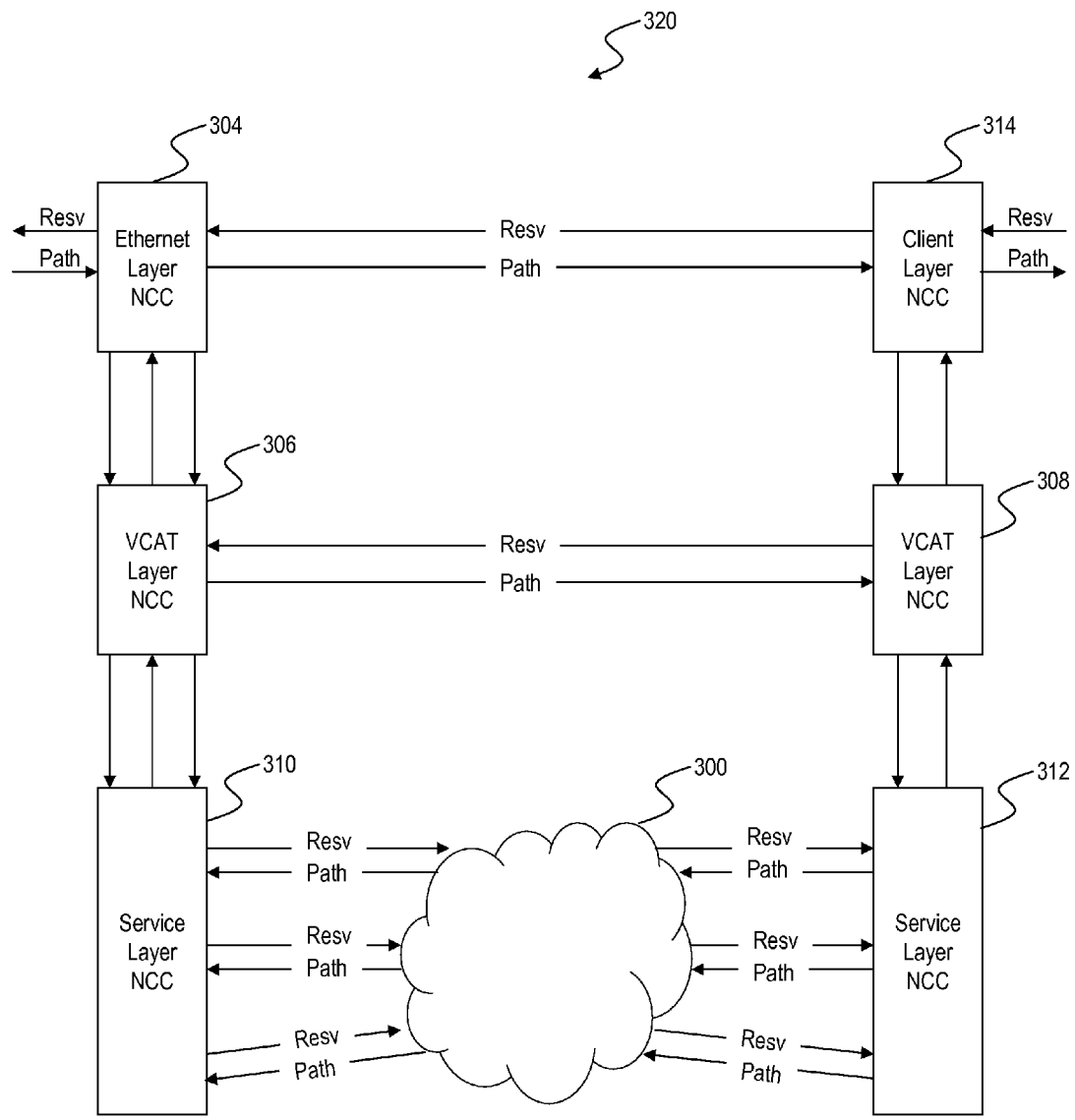
FIG. 8 is a block diagram illustrating message flows for providing an Ethernet connection setup of either an SC or SPC connection according to an exemplary embodiment of the present invention.

Referring to FIG. 8, message flows 320 are illustrated for providing an Ethernet connection setup of either an SC or SPC connection according to an exemplary embodiment of the present invention. The message flows 320 include PATH and RESV messages exchanged between each of the layers 304-314. PATH messages are exchanged from ingress to egress, and RESV messages are exchanged from egress to ingress to set up the Ethernet connection.

The following table describes the messages at each layer and the associated behavior for a connection setup sequence for an SC/SPC connection at the ingress UNI-N:

TABLE 1

Connection Setup Sequence—For SC/SPC Connection at Ingress UNI-N

| Message | Layer | Behavior |
|---|---|---|
| Ethernet PATH message/SPC Connection request from client | Ethernet | 1. Create Ethernet Connection Object<br>2. Read Ethernet Quality of service (Qos) and service level, egress port, label, null CallId, lsp_tunnel_id<br>3. Create CallId<br>4. Create VCAT Connection Object and send VCAT Label Switched Path (LSP) Create Request to Data Connection Limited (DCL) |

TABLE 1-continued

Connection Setup Sequence—For SC/SPC Connection at Ingress UNI-N

| Message | Layer | Behavior |
|---|---|---|
| Receive VCAT SPC Connection Message | VCAT | 1. Create VCAT-layer virtual interface<br>2. Create VCG.<br>3. Read VCAT Qos and service level, egress port, label, CallId, lsp_tunnel_id<br>4. Create new CallId for VCAT layer<br>5. Create SONET Connection Object and send SONET SPC Create Requests to DCL |
| Receive SONET SPC Connection Message | SONET | 1. Create SONET-layer virtual interface if it is the first SONET connection in VCG<br>2. Create drop side Connection Termination Point (CTP)<br>3. Read Qos and service level, egress port, label, CallId, lsp_tunnel_id<br>4. Create new CallId for SONET layer<br>5. Compute Path, and send the routing info back to DCL |
| Receive SONET RESV Message | SONET | 1. Create line side CTP and Cross Connection.<br>2. Send Response for VCAT connection when the last SONET RESV is received.<br>3. Update SONET-layer virtual interface. |
| Receive VCAT RESV Message | VCAT | 1. Send Response for Ethernet layer connection.<br>2. Update VCAT-layer virtual interface |
| Receive Ethernet RESV Message | Ethernet | 1. Ethernet connection is UP. |

The following table describes the messages at each layer and the associated behavior for a connection setup sequence for an SC/SPC connection at the egress UNI-N:

TABLE 2

Connection Setup Sequence—For SC/SPC Connection at Egress UNI-N

| Message | Layer | Behavior |
|---|---|---|
| Receive SONET PATH Message | SONET | 1. Create SONET Connection Object<br>2. Read Qos and service level, egress port, label, CallId, lsp_tunnel_id<br>3. Create Line side CTP |
| Receive SONET RESV Message | SONET | 1. Create VCG, and SONET-layer virtual interface if it is the first SONET connection in VCG<br>2. Create drop side CTP and Cross Connection.<br>3. Update SONET-layer virtual interface.<br>4. Create VCAT Connection Object |
| Receive VCAT PATH Message | VCAT | 1. Read VCAT Qos and service level, egress port, label, CallId, lsp_tunnel_id |
| Receive VCAT RESV Message | VCAT | 1. Create VCAT-layer virtual interface,<br>2. Create Ethernet Connection Object<br>3. Update VCAT-layer virtual interface. |
| Receive Ethernet PATH Message | Ethernet | 1. Read Ethernet Qos and service level, egress port, label, CallId, lsp_tunnel_id |
| Receive Ethernet RESV Message | Ethernet | 1. Ethernet connection is UP |

Figure 9:
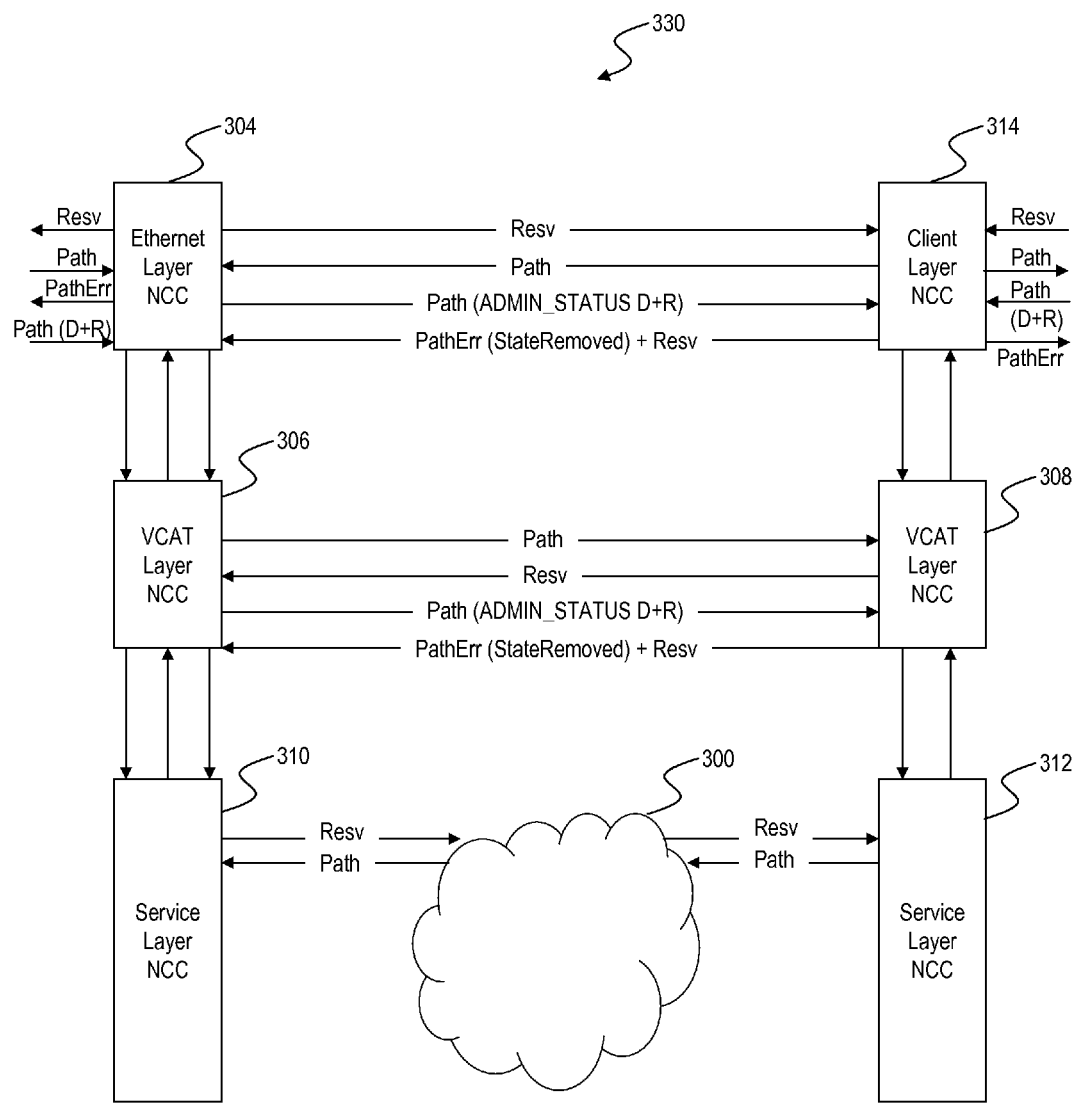
FIG. 9 is a block diagram illustrating message flows for providing an Ethernet bandwidth increase modification to either an SC or SPC connection according to an exemplary embodiment of the present invention.

Referring to FIG. 9, message flows 330 are illustrated for providing an Ethernet bandwidth increase modification to either an SC or SPC connection according to an exemplary embodiment of the present invention. The message flows 330 include PATH, RESV, and PATHERR messages exchanged between each of the layers 304-314. RESV messages are exchanged from ingress to egress, and PATH and PATHERR messages are exchanged from egress to ingress to increase bandwidth of the Ethernet connection.

The following table describes the messages at each layer and the associated behavior for an Ethernet bandwidth increase modification sequence for an SC/SPC connection at the ingress UNI-N:

TABLE 3

BW Modification (Increase) Sequence—For SC/SPC connection at Ingress UNI-N

| Message | Layer | Behavior |
|---|---|---|
| Receive Ethernet PATH Message/SPC Connection Request from client | Ethernet | 1. Find old Ethernet Connection Object<br>2. Create new Ethernet Connection Object and copy connection parameters from the old Ethernet Connection Object<br>3. Read Ethernet Qos and service level, egress port, label, CallId, lsp_tunnel_id<br>4. Create new VCAT Connection Object and send VCAT LSP Create Request to DCL |
| Receive VCAT SPC Connection Message | VCAT | 1. Find old VCAT Connection Object<br>2. Copy connection parameters from the old VCAT Connection Object<br>3. Read VCAT Qos and service level, egress port, label, CallId, lsp_tunnel_id<br>4. Create new SONET Connection Objects and send SONET SPC Create Requests to DCL |
| Receive SONET SPC Connection Message | SONET | 1. Create drop side CTP<br>2. Read Qos and service level, egress port, label, CallId, lsp_tunnel_id<br>3. Compute Path, and send the routing info back to DCL |
| Receive SONET RESV Message | SONET | 1. Create line side CTP and Cross Connection.<br>2. Send Response for the new VCAT connection when the last SONET RESV is received.<br>3. Update SONET-layer virtual interface. |
| Receive VCAT RESV Message | VCAT | 1. Send LSP Deletion Request to DCL for old VCAT connection<br>2. Update VCAT-layer virtual interface |
| Receive VCAT PathErr Message | VCAT | 1. Free old VCAT Connection Object<br>2. Send Response to for the new Ethernet connection. |
| Receive Ethernet RESV Message | Ethernet | 1. New Ethernet connection is UP.<br>2. For SPC connection, send LSP Deletion Request to DCL for old Ethernet connection |
| Receive Ethernet PathErr Message | Ethernet | 1. Free old Ethernet Connection Object |

The following table describes the messages at each layer and the associated behavior for an Ethernet bandwidth increase modification sequence for an SC/SPC connection at the egress UNI-N:

TABLE 4

BW Modification (Increase) Sequence—For SC/SPC connection at Egress UNI-N

| Message | Layer | Behavior |
|---|---|---|
| Receive SONET PATH Message | SONET | 1. Create new SONET Connection Object<br>2. Find old VCAT Connection Object based on LSP tunnel ID<br>3. Create new VCAT Connection Object if it is the first new SONET connection in VCG, and copy connection parameters from the old VCAT Connection Object<br>4. Read Qos and service level, egress port, label, CallId, lsp_tunnel_id<br>5. Create Line side CTP |
| Receive SONET RESV Message | SONET | 1. Create drop side CTP and Cross Connection.<br>2. Update SONET-layer virtual interface. |

TABLE 4-continued

BW Modification (Increase) Sequence—For SC/SPC connection at Egress UNI-N

| Message | Layer | Behavior |
|---|---|---|
| Receive VCAT PATH Message | VCAT | 1. Find old and new VCAT Connection Object Read VCAT Qos and service level, egress port, label, CallId, lsp_tunnel_id<br>2. Find old Ethernet Connection Object<br>3. Create new Ethernet Connection Object and copy connection parameters from the old Ethernet Connection Object. Move SONET connection from old VCAT Connection Object to new VCAT Connection Object |
| Receive VCAT RESV Message | VCAT | 1. Update VCAT-layer virtual interface |
| Receive VCAT PATH Delete Message | VCAT | 1. Free old VCAT Connection Object |
| Receive Ethernet PATH Message | Ethernet | 1. Find old and new Ethernet Connection Object Read Ethernet Qos and service level, egress port, label, CallId, lsp_tunnel_id |
| Receive Ethernet RESV Message | Ethernet | 1. New Ethernet connection is UP |
| Receive Ethernet PATH Delete Message | Ethernet | 1. Free old Ethernet Connection Object |

Figure 10:
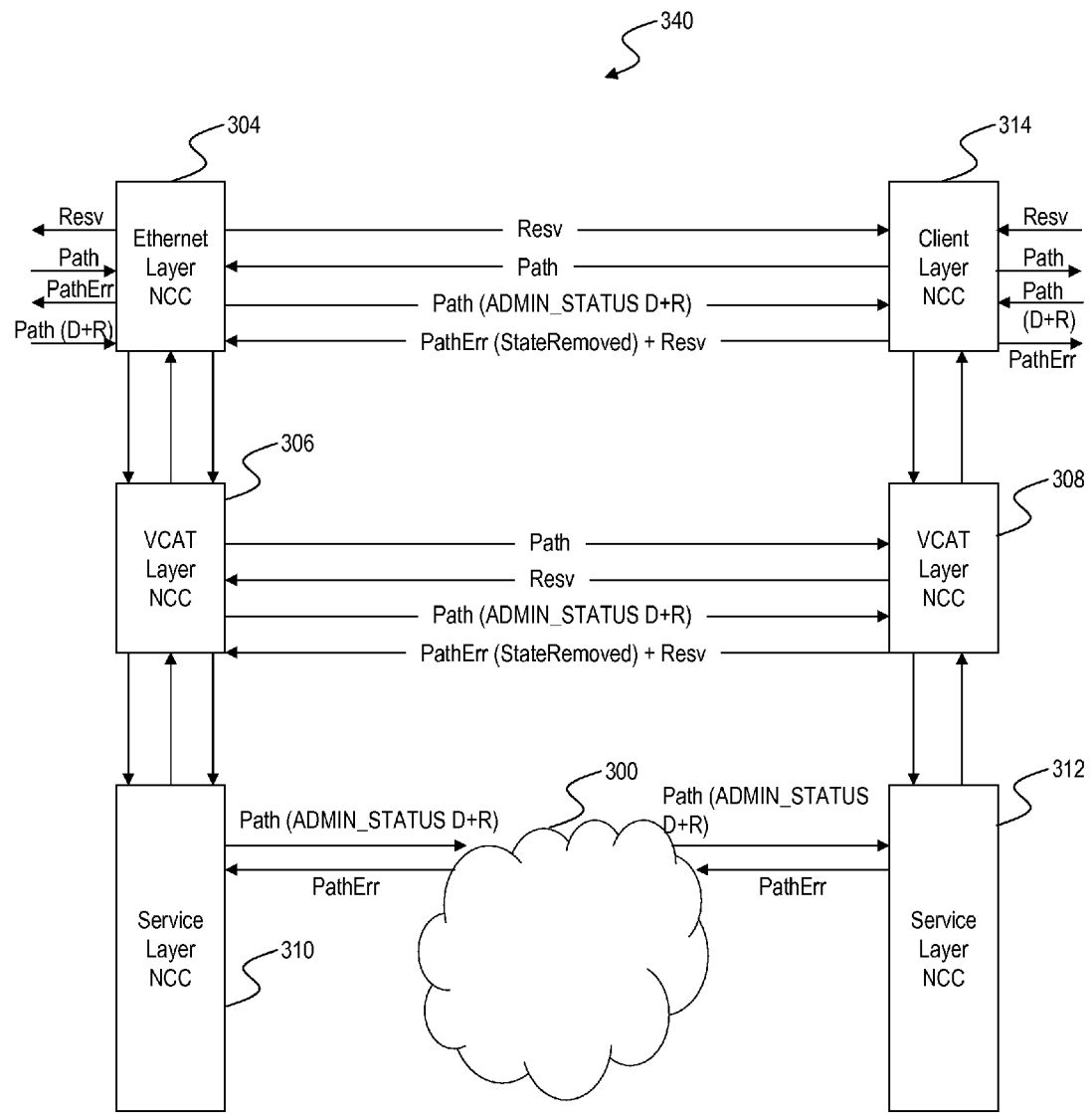
FIG. 10 is a block diagram illustrating message flows for providing an Ethernet bandwidth decrease modification to either an SC or SPC connection according to an exemplary embodiment of the present invention.

Referring to FIG. 10, message flows 340 are illustrated for providing an Ethernet bandwidth decrease modification to either an SC or SPC connection according to an exemplary embodiment of the present invention. The message flows 340 include PATH, RESV, and PATHERR messages exchanged between each of the layers 304-314. RESV messages are exchanged from ingress to egress, and PATH and PATHERR messages are exchanged from egress to ingress to decrease bandwidth of the Ethernet connection.

The following table describes the messages at each layer and the associated behavior for an Ethernet bandwidth decrease modification sequence for an SC/SPC connection at the ingress UNI-N:

TABLE 5

BW Modification (Decrease) Sequence—Ingress Node for SC/SPC connection

| Message | Layer | Behavior |
|---|---|---|
| Receive Ethernet PATH Message/SPC Connection Request from client | Ethernet | 1. Find old Ethernet Connection Object based on tunnel ID<br>2. Create new Ethernet Connection Object and copy connection parameters from the old Ethernet Connection Object<br>3. Read Ethernet Qos and service level, egress port, label, CallId, lsp_tunnel_id |
| Receive Ethernet RESV Message | Ethernet | 1. New Ethernet connection is up.<br>2. For SPC connection, send LSP Deletion Request to DCL for old Ethernet connection |
| Receive Ethernet PathErr message | Ethernet | 1. Create new VCAT Connection Object and copy connection parameters from the old VCAT Connection Object<br>2. Send new VCAT LSP Create Request to DCL<br>3. Free old Ethernet Connection Object. |
| Receive VCAT PATH Message | VCAT | 1. Read VCAT Qos and service level, egress port, label, CallId, lsp_tunnel_id<br>2. Move some of the SONET connection from old VCAT to new VCAT Connection Object. |
| Receive VCAT RESV Message | VCAT | 1. Update VCAT-layer virtual interface<br>2. Send LSP Deletion Request to DCL for old VCAT connection |
| Receive VCAT PathErr message | VCAT | 1. Send LSP Deletion Request to DCL for some old SONET connections |
| Receive SONET PathErr message | SONET | 1. Free CTPs and delete xconnection for the SONET connection. Free SONET Connection Object<br>2. Free old VCAT Connection Object if it is the last SONET connection to be deleted. |

The following table describes the messages at each layer and the associated behavior for an Ethernet bandwidth decrease modification sequence for an SC/SPC connection at the egress UNI-N:

TABLE 6

BW Modification (Decrease) Sequence—Egress Node for SC/SPC connection

| Message | Layer | Behavior |
| --- | --- | --- |
| Receive Ethernet PATH message | Ethernet | 1. Find old Ethernet Connection Object based on tunnel ID<br>2. Create new Ethernet Connection Object and copy connection parameters from the old Ethernet Connection Object<br>3. Read Ethernet Qos and service level, egress port, label, CallId, lsp_tunnel_id |
| Receive Ethernet RESV Message | Ethernet | 1. The new Ethernet connection is up |
| Receive Ethernet PATH Delete Message | Ethernet | 1. Move VCAT under old Ethernet connection to new Ethernet connection, Free old Ethernet Connection Object |
| Receive VCAT PATH Message | VCAT | 1. Create new VCAT Connection Object, copy connection parameters from the old VCAT Connection Object. Read VCAT Qos and service level, egress port, label, CallId, lsp_tunnel_id. move the SONET connections from old VCAT to new VCAT |
| Receive VCAT RESV Message | VCAT | 1. Update VCAT-layer virtual interface |
| Receive VCAT PATH Delete message | VCAT | 1. Free old VCAT Connection Object |
| Receive SONET PATH Delete message | SONET | 1. Free CTP and delete Cross Connection for the SONET connection. Free old SONET Connection Objects |

Figure 11:
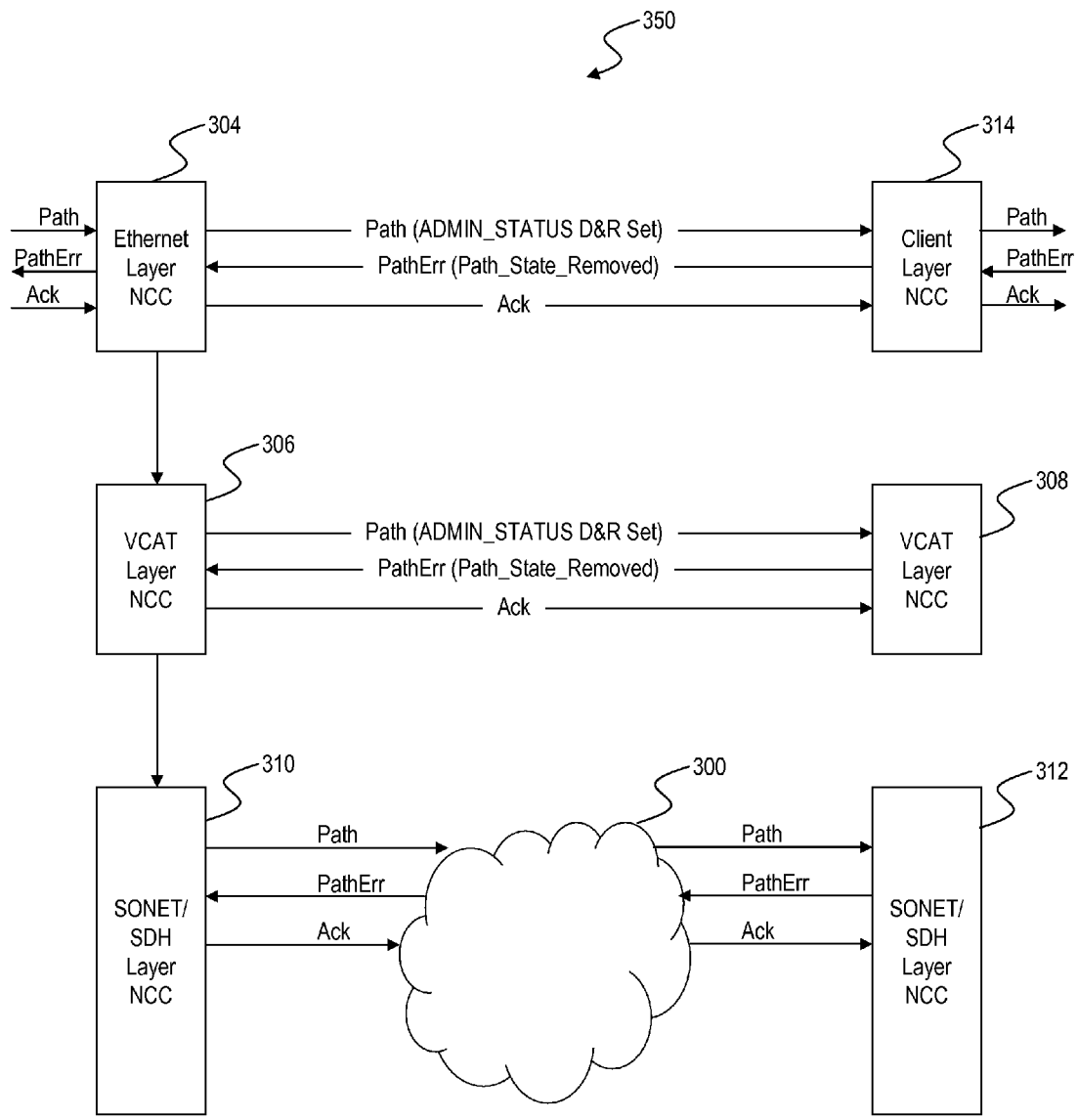
FIG. 11 is a block diagram illustrating message flows for originating client deletion of either an SC or SPC connection according to an exemplary embodiment of the present invention.

Referring to FIG. 11, message flows 350 are illustrated for originating client deletion of either an SC or SPC connection according to an exemplary embodiment of the present invention. The message flows 350 include PATH, ACK, and PATHERR messages exchanged between each of the layers 304-314. PATH and ACK messages are exchanged from ingress to egress, and PATHERR messages are exchanged from egress to ingress to delete the originating client of the Ethernet connection.

The following table describes the messages at each layer and the associated behavior for an Originating Client Deletion sequence for an SC/SPC connection at the ingress UNI-N:

TABLE 7

Originating Client Deletion Sequence—For SC/SPC Connection at Ingress UNI-N

| Message | Layer | Behavior |
| --- | --- | --- |
| Receive Ethernet PATH Delete Message/SPC Connection Deletion Request from client | Ethernet | |
| Receive Ethernet PathErr Message | Ethernet | 1. Send VCAT LSP Deletion Request to DCL |
| Receive VCAT SPC Connection Deletion message | VCAT | |
| Receive VCAT PathErr Message | VCAT | 1. Delete VCAT-layer virtual interface<br>2. Send SONET LSP Deletion Requests to DCL |
| Receive SONET SPC Connection Deletion message | SONET | |

TABLE 7-continued

Originating Client Deletion Sequence—For SC/SPC Connection at Ingress UNI-N

| Message | Layer | Behavior |
|---|---|---|
| Receive SONET PathErr Message | SONET | 1. Delete SONET-layer virtual interface if it is the last SONET connection in VCG.<br>2. Delete CTPs and Cross Connection<br>3. Free Connection Object and Free VCAT-layer Connection Objects if it is the last SONET connection in VCG.<br>4. For SC connection, free Ethernet Connection Object if the connection is a SC connection. |

The following table describes the messages at each layer and the associated behavior for an Originating Client Deletion sequence for an SC/SPC connection at the egress UNI-N:

TABLE 8

Origination Client Deletion Sequence—For SC/SPC Connection at Egress UNI-N

| Message | Layer | Behavior |
|---|---|---|
| Receive Ethernet PATH Delete Message | Ethernet | |
| Receive Ethernet PathErr Message | Ethernet | |
| Receive VCAT PATH Delete message | VCAT | |
| Receive VCAT PathErr Message | VCAT | 1. Delete VCAT-layer virtual interface |
| Receive SONET PATH Delete Deletion message | SONET | |
| Receive SONET PathErr Message | SONET | 1. Delete SONET-layer virtual interface if it is the last SONET connection in VCG.<br>2. Delete CTPs and Cross Connection<br>3. Free SONET Connection Object<br>4. Free Ethernet and VCAT Connection Objects if it is the last SONET connection in VCG |

Figure 12:
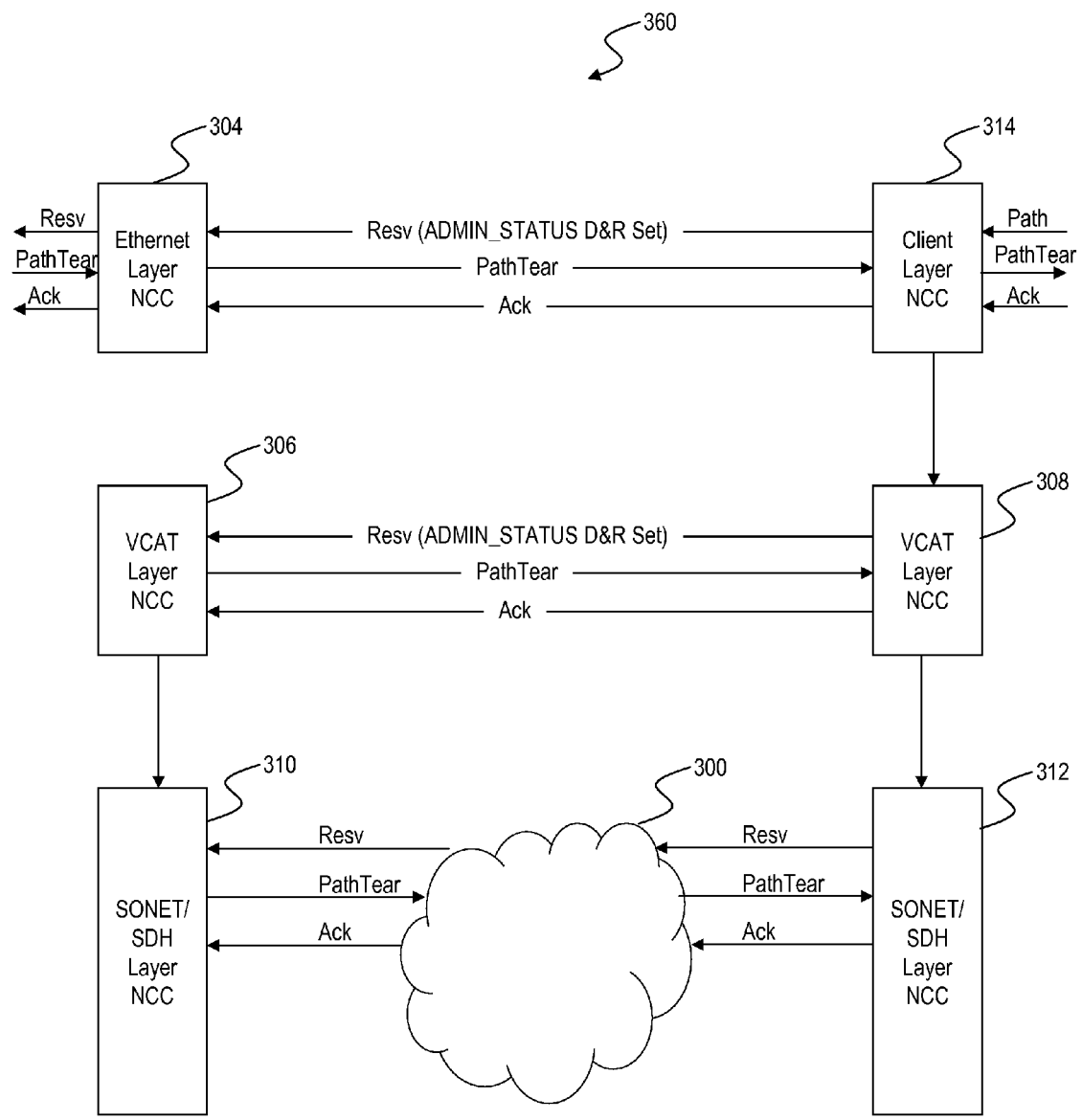
FIG. 12 is a block diagram illustrating message flows for terminating client deletion of either an SC or SPC connection according to an exemplary embodiment of the present invention.

Referring to FIG. 12, message flows 360 are illustrated for terminating client deletion of either an SC or SPC connection according to an exemplary embodiment of the present invention. The message flows 360 include RESV, ACK, and PATHTEAR messages exchanged between each of the layers 304-314. PATHTEAR messages are exchanged from ingress to egress, and RESV and ACK messages are exchanged from egress to ingress to delete the terminating client of the Ethernet connection.

The following table describes the messages at each layer and the associated behavior for a Terminating Client Deletion sequence for an SC/SPC connection at the ingress UNI-N:

TABLE 9

Connection Deletion Sequence—For SC/SPC Connection at Ingress UNI-N

| Message | Layer | Behavior |
|---|---|---|
| Receive Ethernet RESV Delete Message | Ethernet | |
| Receive Ethernet PathTear Message | Ethernet | |

TABLE 9-continued

Connection Deletion Sequence—For SC/SPC Connection at Ingress UNI-N

| Message | Layer | Behavior |
|---|---|---|
| Receive VCAT RESV Delete Deletion message | VCAT | |
| Receive VCAT PathTear Message | VCAT | 1. Delete VCAT-layer virtual interface |
| Receive SONET RESV Delete Deletion message | SONET | |
| Receive SONET PathTear Message | SONET | 1. Delete SONET-layer virtual interface if it is the last SONET connection in VCG.<br>2. Delete CTPs and Cross Connection. Free SONET Connection Object<br>3. Free VCAT Connection Objects if it is the last SONET connection in VCG<br>4. For SC connection, free Ethernet Connection Object if the connection is a SC connection. |

The following table describes the messages at each layer and the associated behavior for a Terminating Client Deletion sequence for an SC/SPC connection at the egress UNI-N:

TABLE 10

Connection Deletion Sequence—For SC/SPC Connection at Egress UNI-N

| Message | Layer | Behavior |
|---|---|---|
| Receive Ethernet RESV Delete Message/SPC Connection Deletion Request from client | Ethernet | |
| Receive Ethernet PathTear Message | Ethernet to DCL | 1. Send VCAT LSP Deletion Request |
| Receive VCAT SPC Connection Deletion message | VCAT | |
| Receive VCAT PathTear Message | VCAT | 1. Delete VCAT-layer virtual interface<br>2. Send SONET LSP Deletion Requests |
| Receive SONET SPC Connection Deletion message | SONET | to DCL |
| Receive SONET PathTear Message | SONET | 1. Delete SONET-layer virtual interface if it is the last SONET connection in VCG.<br>2. Delete CTPs and Cross Connection<br>3. Free SONET Connection Object<br>4. Free Ethernet and VCAT Connection Objects if it is the last SONET connection in VCG |

Figure 13:
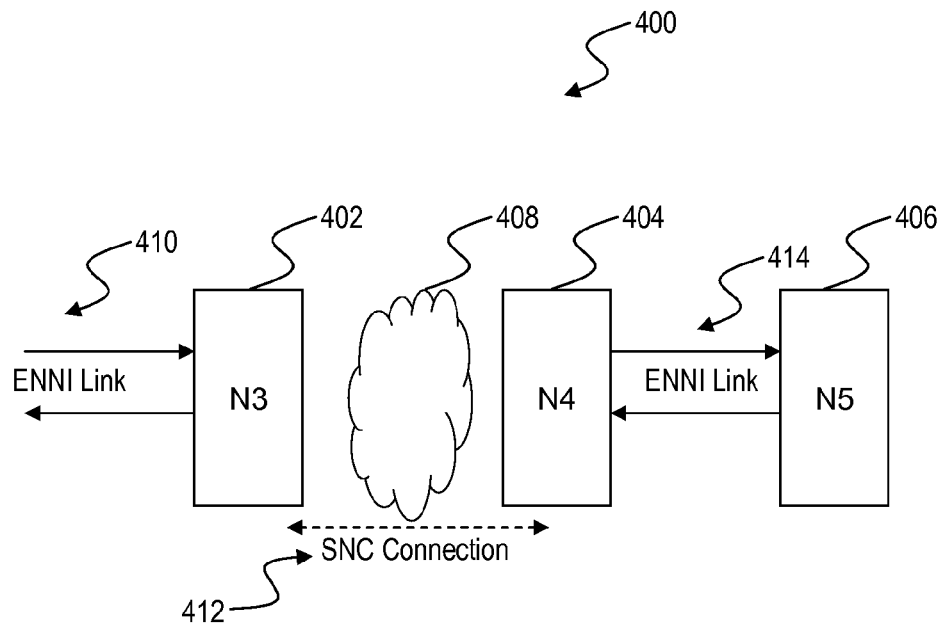
FIG. 13 is a block diagram illustrating label negotiation on an ASON network according to an exemplary embodiment of the present invention.

Referring to FIG. 13, label negotiation is illustrated on an ASON network 400 according to an exemplary embodiment of the present invention. In the ASON network 400, resource conflict between two border nodes (or between edge node and end clients) is resolved through two different ways. First, a PATH message can carry a label Set for negotiation to its downstream node/SC client. In case of Label Set object, a set of labels are provided from upstream node to downstream node/SC client. The downstream node/SC client has to select one label from this set and pass it in the RESV message back or reject the PATH message. Second, a PATH message carries explicit label information to its downstream node. The downstream node/SC client has to select this label only and pass it in the RESV message back or if the label is already in use then it rejects the PATH message.

The current approach visualizes border node (BN) which receives the incoming request to create a subtended node connection (SNC) to terminate on a virtual connection point (VCP) which is a logical entity created by this connection at a terminating border node. At this point the PATH message is forwarded to the next domain. Later after receiving the RESV message from a downstream node, based on the resource availability (for the label passed in RESV message), a cross connect is created with the new resource and this logical entity and the RESV message is forwarded to the originating border node via in-band communication. Such a connection is also supported to recover from persistence across reboots. This allows both of the ways for resources conflicts to be resolved discussed herein to exist and allows lot of flexibility in setting up connections.

The present invention provides a mechanism for label negotiation in any technology to resolve resource conflicts. The present invention allows the original request to carry a set of labels, and still allow a downstream node in the next network or client to decide which resource to use. The only concern is that whatever label selected by the downstream node should be available in the upstream node for the connection to succeed. This allows localization of resources at border nodes and an administrator can decide what resources could be for what type of connections at the domain entry nodes. In our case, this is implemented in a current ASON feature where the request originating or received in one domain's border node and carried across multiple nodes in that domain for the remote border node of that domain can establish a subtended node connection (SNC) from the border node to that node and terminate that connection on a logical entity. At this point, the remote border node's resources are not used but a suggested label is forwarded based on the connection's bandwidth. When a RESV message is received from downstream with a specific label, then that resource is reserved in that node and the cross connect is created. Later this RESV message is passed onto the originating node via in-band communication.

FIG. 13 illustrates an exemplary embodiment of label negotiation according to the present invention. The ASON network 400 includes three nodes 402,404,406, each configured as a border node with E-NNI links. The nodes 402,404 are part of a domain 408, and the node 406 is part of another domain connected to a client (not shown). First, node 402 receives a PATH message for an ASON connection via an E-NNI link 410. Next, the shortest path from node 402 to an end node/client for the connection is calculated identifying node 404 as a border node. A SNC connection 412 is constructed through the domain 408 with an end point as a logical point VCP and an end node as the node 404. This information is appended to the PATH message. Node 404 receives the SNC connection 412 along with the PATH message, and creates the logical end point VCP and extracts the PATH message. The PATH message is forward onto node 406 via an E-NNI link 414. Node 406 receives a RESV message via the E-NNI link 414 from node 404, and extracts label information and reserves resources at node 404 on the E-NNI link 414. The RESV message is forwarded to the originating node 402 which receives the RESV message and appends its label on the E-NNI link 410 and sends it to an upstream node.

The present invention defines a mechanism for performing label negotiation and maintaining resources in a better manner as binding a resource which could be dropped later could result in resource and connection contentions. The present invention supports Label negotiation and does not bind and release a connection before label negotiation. This offers flexibility in selecting label from a downstream node and also from a different network. For example, an operator can set particular resources to particular connections at downstream nodes and based on type of connections, can allow the system to return those resources, e.g. timeslots from 1-12 for high priority connections, 13-26 for medium priority connections, and the like.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An Automatically Switched Optical Network (ASON), comprising:
    a plurality of nodes in a domain utilizing ASON for connections, wherein each of the plurality of nodes comprise one of a border node and an interior node;
    a routing controller located at a node of the plurality of nodes;
    a plurality of internal Network Node Interface links interconnecting the plurality of nodes;
    one or more external Network Node Interfaces at each border node, wherein the external Network Node Interface connects to a node in another domain;
    a client connected to a node of the plurality of nodes with a User to Network Interface; and
    an ASON database at each of the plurality of nodes comprising topology and routing information, wherein the topology and routing information in the ASON database at each of the plurality of nodes is synchronized through the internal Network Node Interface links;
    wherein the node connected to the client receives external Network Node Interface (NNI) and User to Network Interface (UNI) provisioning from the client and stores the NNI and UNI provisioning in the ASON database at the node connected to the client and forwards the NNI and UNI provisioning to other nodes of the plurality of nodes through the plurality of internal Network Node Interface links.

2. The Automatically Switched Optical Network of claim 1, wherein the node with the routing controller is configured to receive abstract link and neighbor domain provisioning from the client and store the abstract link and neighbor domain provisioning in the ASON database at the node with the routing controller.

3. The Automatically Switched Optical Network of claim 1, wherein the node with the routing controller is configured to receive neighbor domain topology information through the one or more external Network Node Interfaces at each border node through the Domain to Domain Routing Protocol.

4. The Automatically Switched Optical Network of claim 1, wherein the ASON database comprises:
- a Transport Network Address tree maintaining an index of all Transport Network Addresses in the Automatically Switched Optical Network;
- a Local Domain tree maintaining an index of all of the plurality of nodes in the domain; and
- a Remote Domain tree maintaining an index of all of a second plurality of nodes in all remote domains connected to the domain through the one or more external Network Node Interfaces;
- wherein each of the plurality of nodes and the second plurality of nodes comprises a link list listing all links originating or terminating at each of the plurality of nodes and the second plurality of nodes and a second link list listing all Transport Network Addresses connected to each of the plurality of nodes and the second plurality of nodes; and
- wherein each link in the link list and the second link list comprises a protection type, cost, and metrics.

5. The Automatically Switched Optical Network of claim 4, further comprising a network element controller at each of the plurality of nodes in communication with the ASON database, wherein the network element controller is configured to implement a path computation algorithm using the ASON database.

6. The Automatically Switched Optical Network of claim 5, wherein the path computation algorithm comprises:
- checking for destination Transport Network Address in the ASON database;
- determining the node of the plurality of nodes and the second plurality of nodes that hosts the Transport Network Address;
- if an Explicit Route Object exists, validating the Explicit Route Object from a current node to a last node which is hosting the Transport Network Address, and using a service level constraint to ensure the Explicit Route Object comprises the right protection type to provide service; and
- if no Explicit Route Object exists, traversing through all links in the link list and the second link list to get a shortest path based on a constraint.

7. The Automatically Switched Optical Network of claim 5, wherein the constraint comprises one of lowest cost, service class, link protection type, and a combination thereof.

8. The Automatically Switched Optical Network of claim 1, wherein each of the plurality of nodes and the client are configured to request an Ethernet connection in the Automatically Switched Optical Network, wherein the request comprises one of creating, deleting, increasing bandwidth, and decreasing bandwidth of the Ethernet connection.

9. The Automatically Switched Optical Network of claim 8, wherein each of the creating, deleting, increasing bandwidth, and decreasing bandwidth of the Ethernet connection request comprise a sequence of message flows across Ethernet, Virtual Concatenation, and Synchronous Optical Network (SONET) layers of the Automatically Switched Optical Network.

10. The Automatically Switched Optical Network of claim 1, wherein each of the plurality of nodes comprising border nodes is configured to provide label negotiation of a sub network connection during set up of a connection.

11. A method of handling Ethernet connections in an Automatically Switched Optical Network (ASON), comprising

- at an ingress node, receiving one of an Ethernet PATH message and a soft permanent connection request from a client and performing associated Ethernet layer setup;
- at the ingress node, sending a Virtual Concatenation layer soft permanent connection request to an egress node and performing associated Virtual Concatenation layer setup;
- at the ingress node, sending a Synchronous Optical Network (SONET) layer soft permanent connection request to the egress node and performing associated SONET layer setup;
- at the egress node, receiving a SONET PATH message and performing associated SONET layer setup;
- at the ingress node and the egress node, receiving a SONET RESV message and performing associated SONET layer setup;
- at the ingress node and the egress node, receiving a Virtual Concatenation layer RESV message and performing associated Virtual Concatenation layer setup;
- at the egress node, receiving an Ethernet PATH message and performing associated Ethernet layer setup; and
- at the ingress node and the egress node, receiving an Ethernet RESV message and performing associated Ethernet layer setup.

12. The method of handling Ethernet connections of claim 11, further comprising:
- at the ingress node or the egress node, receiving a request for increased bandwidth comprising one of an Ethernet PATH message and a soft permanent connection request from the client; and
- exchanging messages between the ingress node and the egress node at the Ethernet layer, Virtual Concatenation layer, and SONET layer to provide increased bandwidth.

13. The method of handling Ethernet connections of claim 11, further comprising:
- at the ingress node or the egress node, receiving a request for decreased bandwidth comprising one of an Ethernet PATH message and a soft permanent connection request from the client; and
- exchanging messages between the ingress node and the egress node at the Ethernet layer, Virtual Concatenation layer, and SONET layer to provide decreased bandwidth.

14. The method of handling Ethernet connections of claim 11, further comprising:
- at the ingress node, receiving a request for originating client deletion comprising one of an Ethernet PATH delete message and a soft permanent connection deletion request from the client; and
- exchanging messages between the ingress node and the egress node at the Ethernet layer, Virtual Concatenation layer, and SONET layer to provide originating client deletion.

15. The method of handling Ethernet connections of claim 11, further comprising:
- at the ingress node or the egress node, receiving a request for connection deletion comprising one of an Ethernet RESV delete message and a soft permanent connection deletion request from the client; and
- exchanging messages between the ingress node and the egress node at the Ethernet layer, Virtual Concatenation layer, and SONET layer to provide connection deletion.

16. A network utilizing Automatically Switched Optical Network (ASON) for connections, comprising:
- a plurality of nodes in an Automatically Switched Optical Network domain, wherein each of the plurality of nodes comprise one of a border node and an interior node;

a routing controller located at a node of the plurality of nodes;

a plurality of internal Network Node Interface links interconnecting the plurality of nodes;

one or more external Network Node Interfaces at each border node, wherein the external Network Node Interface connects to a node in another domain;

a client connected to a node of the plurality of nodes with a User to Network Interface;

an ASON database at each of the plurality of nodes comprising topology and routing information; and wherein each of the plurality of nodes is configured to update the ASON database at each of the plurality of nodes based upon data from the plurality of internal Network Node Interface links and the one or more external Network Node Interfaces; and wherein each of the plurality of nodes is configured to provide label negotiation of a sub network connection during setup of a connection.

17. The network of claim 16, wherein each of the plurality of nodes is configured is configured to compute a shortest path through the plurality of nodes for one of a switched connection and a soft permanent connection utilizing one or more of the ASON databases.

18. The network of claim 17, wherein the computation of the shortest path utilizes one of lowest cost, service class, link protection type, and a combination thereof as a constraint.

19. The network of claim 16, wherein each of the plurality of nodes is configured is configured to:

step up an Ethernet connection over the plurality of nodes;

increase bandwidth of the Ethernet connection;

decrease bandwidth of the Ethernet connection;

delete an originating client of the Ethernet connection; and delete a terminating client of the Ethernet connection.

* * * * *